United States Patent [19]

Fujita et al.

[11] 4,100,540

[45] Jul. 11, 1978

[54] METHOD OF DRIVING LIQUID CRYSTAL MATRIX DISPLAY DEVICE TO OBTAIN MAXIMUM CONTRAST AND REDUCE POWER CONSUMPTION

[75] Inventors: Hiroo Fujita, Sayama; Akira Tsuzuki, Tokyo; Shigeru Morokawa, Higashiyamato, all of Japan

[73] Assignee: Citizen Watch Co., Ltd., Tokyo, Japan

[21] Appl. No.: 742,971

[22] Filed: Nov. 17, 1976

[30] Foreign Application Priority Data

| Nov. 18, 1975 [JP] | Japan | 50-137839 |
| May 7, 1976 [JP] | Japan | 51-051789 |
| Sep. 25, 1976 [JP] | Japan | 51-115055 |
| Sep. 7, 1976 [JP] | Japan | 51-106917 |

[51] Int. Cl.² .................................................. G09F 9/32
[52] U.S. Cl. ........................... 340/324 M; 340/336; 350/333
[58] Field of Search ........... 350/160 LC; 340/166 EL, 340/336, 324 M

[56] References Cited

U.S. PATENT DOCUMENTS

| 3,891,307 | 6/1975 | Tsukamoto et al. | 350/160 LC |
| 3,921,162 | 11/1975 | Fukai et al. | 350/160 LC |
| 3,922,667 | 11/1975 | Ueda et al. | 350/160 LC |
| 3,949,242 | 4/1976 | Hirasawa et al. | 350/160 LC |
| 3,955,187 | 5/1976 | Bigelow | 350/160 LC |
| 3,976,362 | 8/1976 | Kawakami | 350/160 LC |

*Primary Examiner*—Marshall M. Curtis
*Attorney, Agent, or Firm*—Frank J. Jordan

[57] ABSTRACT

A method of driving a liquid crystal display matrix, in which digit drive signals are applied to digit electrodes and segment drive signals are applied to segment electrodes. Each of the digit drive signals has first pulse components of a first pulse width varying at a plurality of voltage potentials in a first predetermined sequence during each cycle, and a second pulse component of a second pulse width having a selected one of the voltage potentials during each half cycle. Each of the segment drive signals has first pulse components of the first pulse width varying at at least two of the voltage potentials in a second predetermined sequence, and a second pulse component of the second pulse width having a voltage potential equal to that of the second pulse component of the digit drive signal. The second pulse components of the digit and segment drive signals are in synchronism with each other, whereby the potential difference across the electrodes will be zero to reduce the root-mean-square voltage applied to the liquid crystal display matrix. The duty cycles of the digit drive signals and the segment drive signals are varied in dependence on an ambient temperature.

5 Claims, 48 Drawing Figures

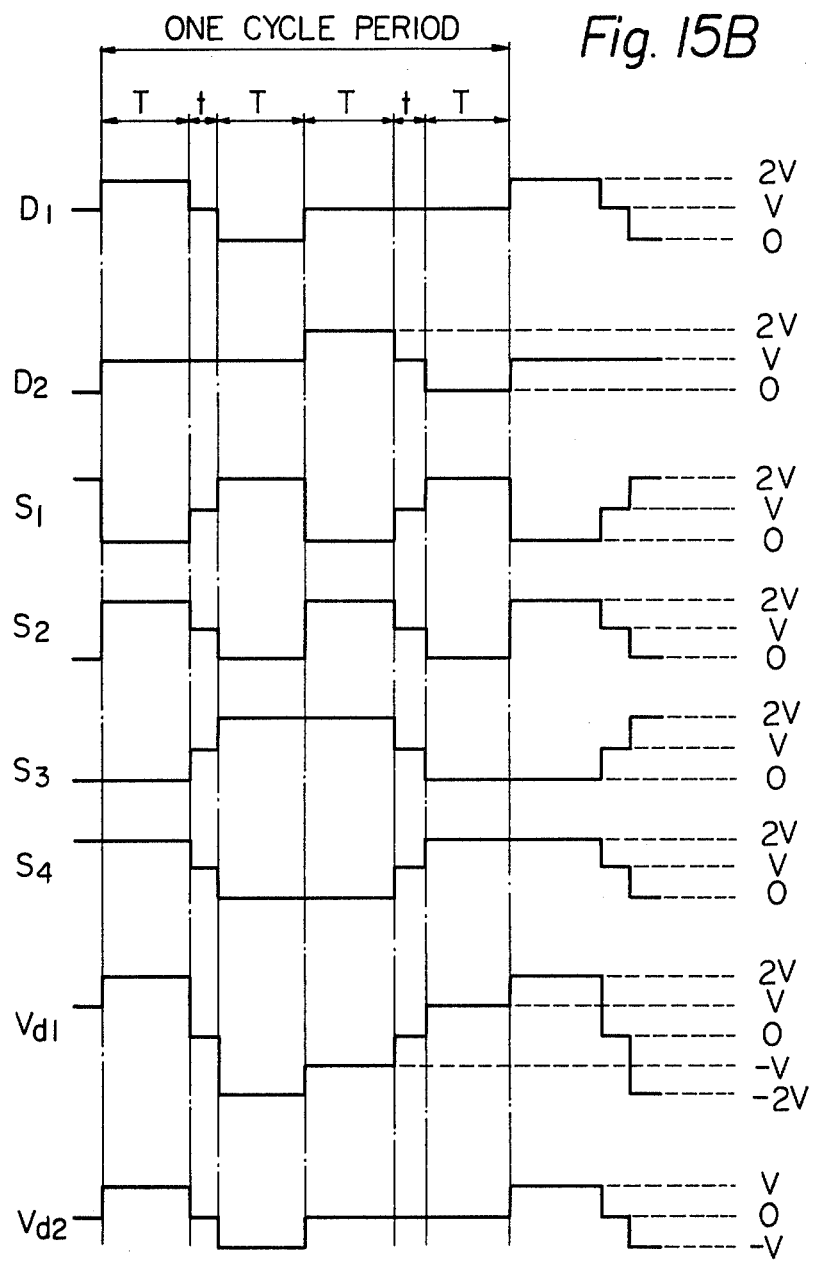

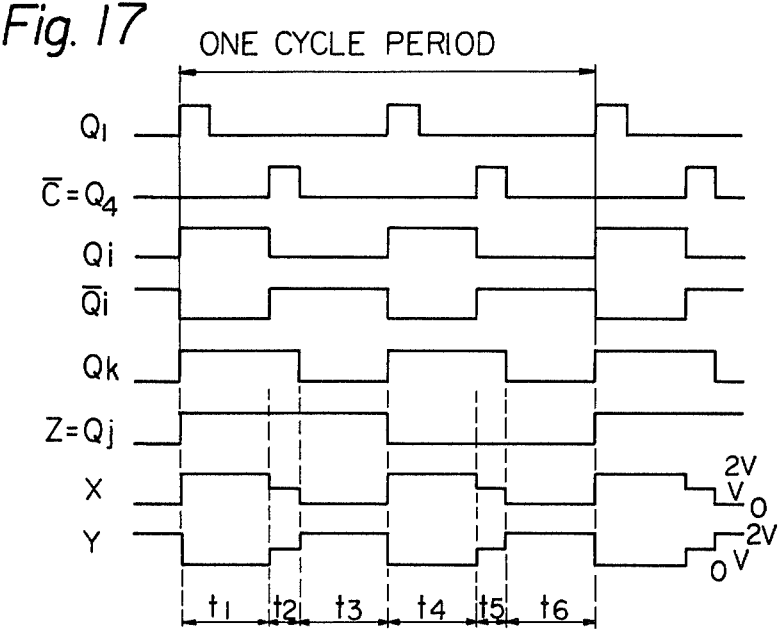
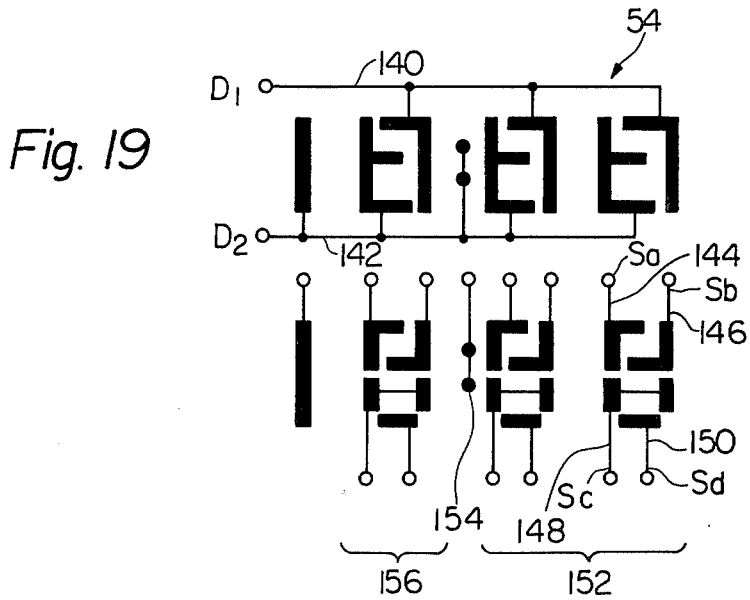

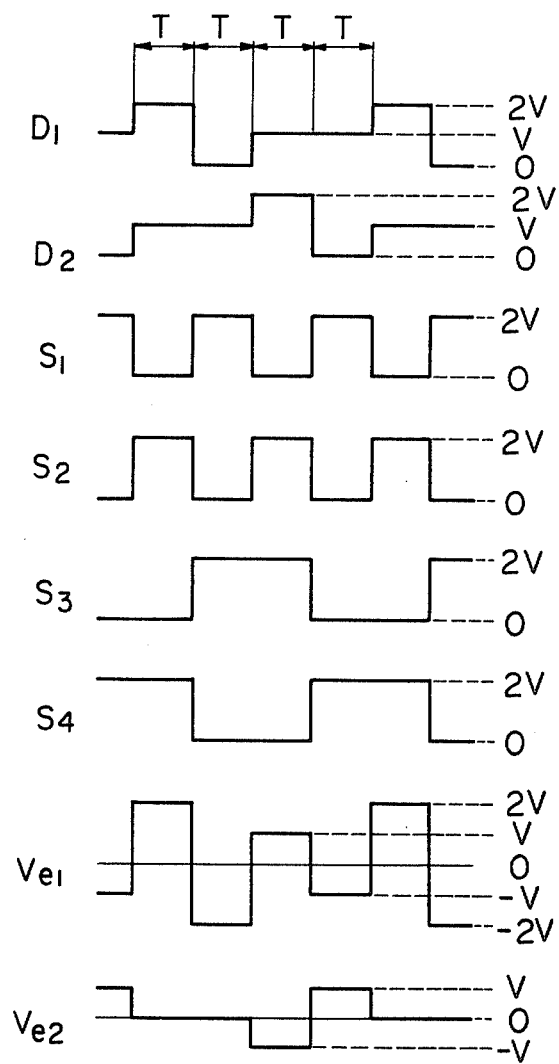

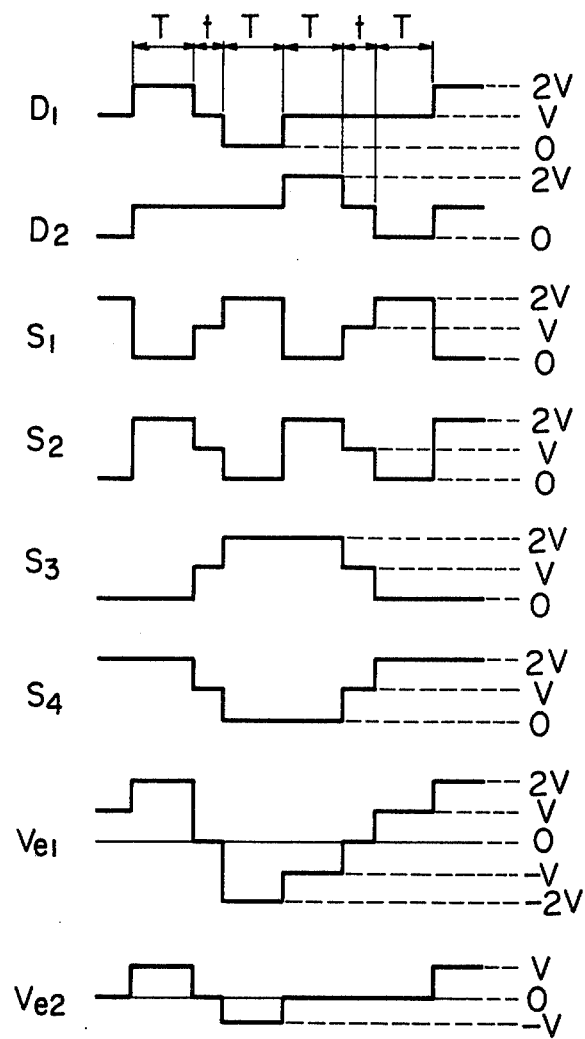

Fig. 31
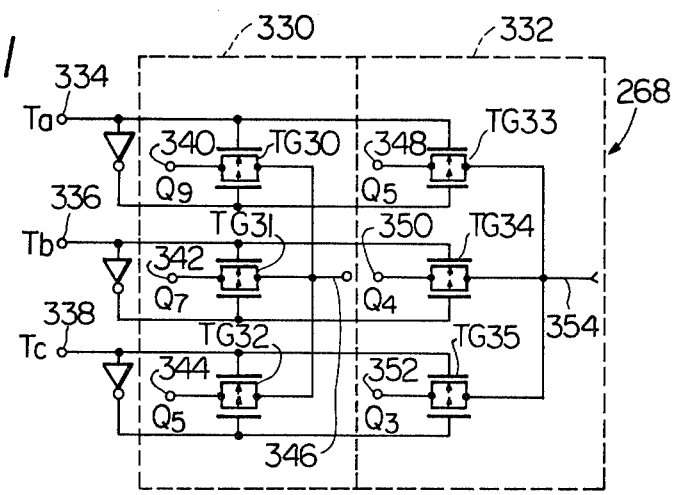
Fig. 32
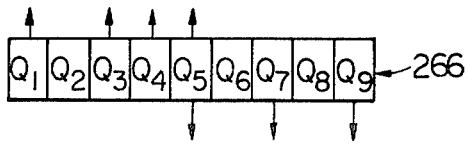
Fig. 34
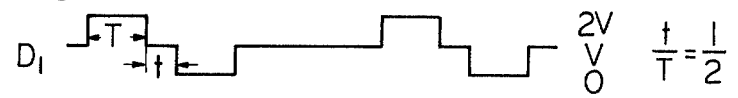
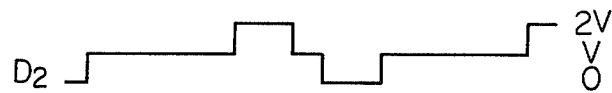
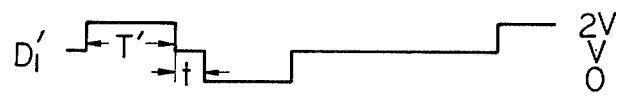
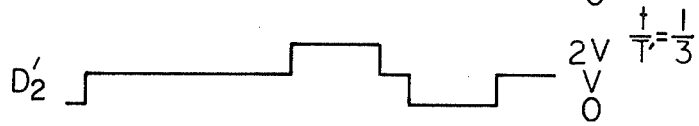
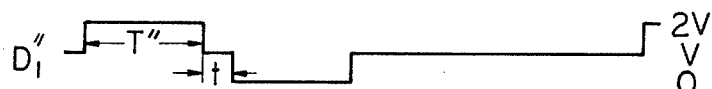
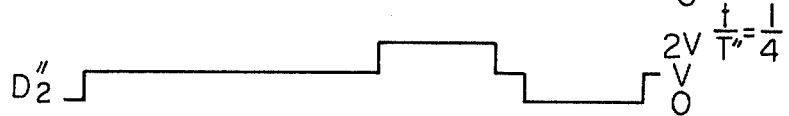

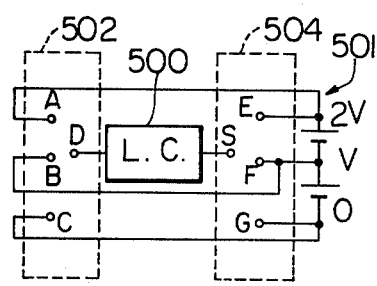
Fig. 40A
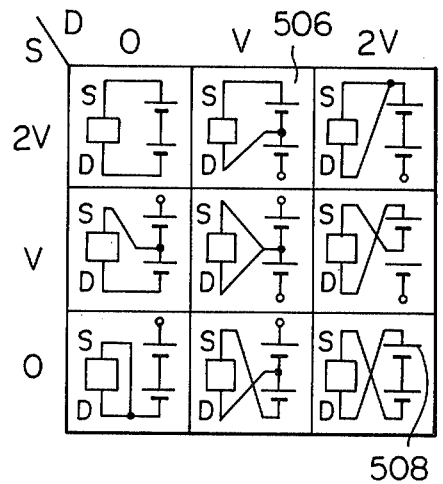
Fig. 40B
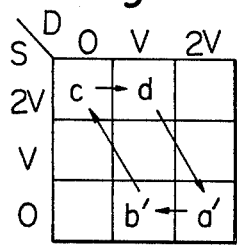
Fig. 40C
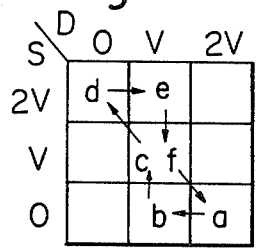
Fig. 40D
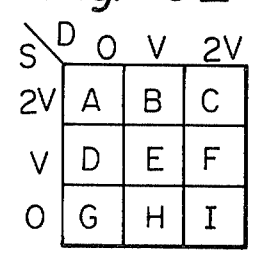
Fig. 40E
Fig. 41

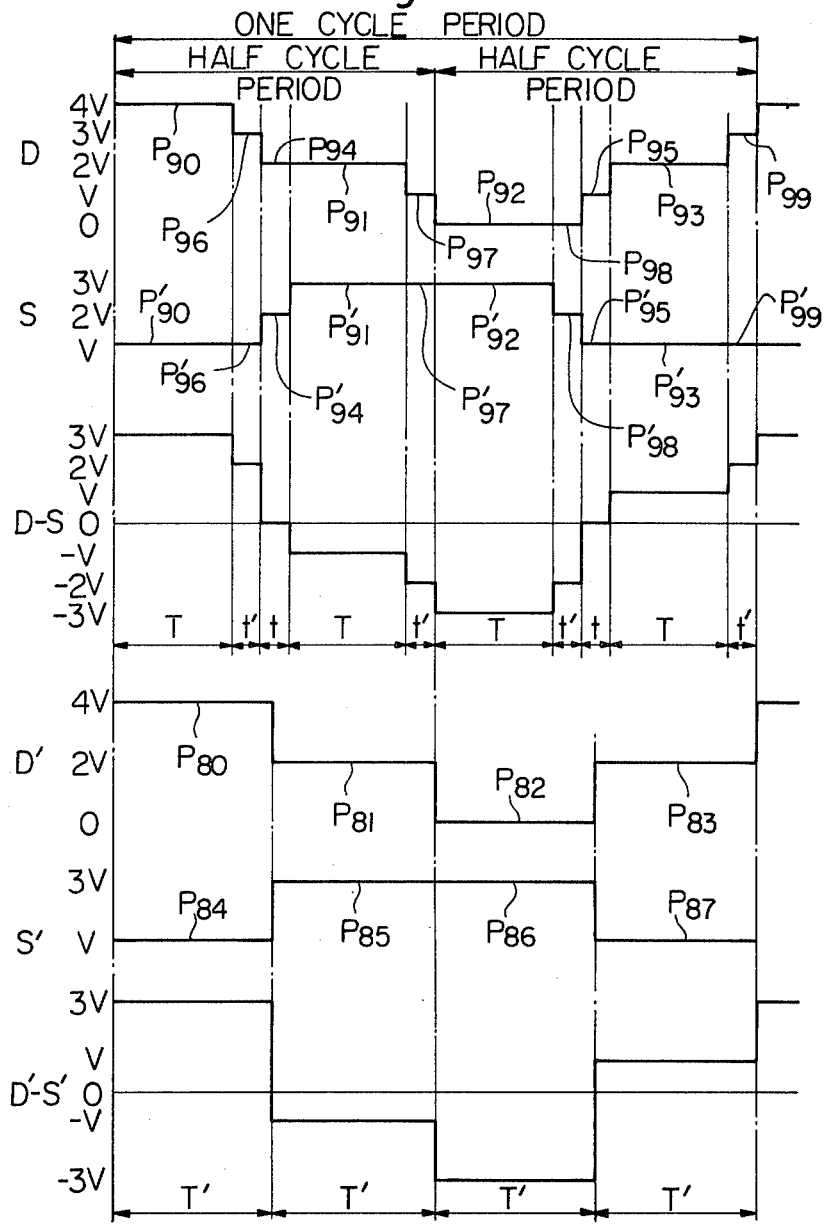

METHOD OF DRIVING LIQUID CRYSTAL MATRIX DISPLAY DEVICE TO OBTAIN MAXIMUM CONTRAST AND REDUCE POWER CONSUMPTION

This invention relates to driver circuits for liquid crystal display devices and, more particularly, to a driver circuit for a liquid crystal display device arranged in a matrix configuration.

As is well known, there are two types of driving techniques for liquid crystals i.e., a static driving technique and a dynamic or matrix driving technique. The dynamic driving techniques have been increasingly used in recent years to minimize the size of a hardware and reduce the manufacturing costs. The dynamic driving techniques are superior to the static driving techniques in various aspects. However, a problem is encountered with the dynamic driving techniques in that a crosstalk will frequently take place, making matric displays impracticable. To solve this problem, a voltage equalizing method has been proposed with a view to equalizing crosstalk voltages appearing on half selected segments. This method clearly offers the advantage over the two-frequency method of using a low frequency signal and a high frequency signal. However, many problems are stll encountered in that the contrast ratio is reduced at a fixed viewing angle because of the rms (root-mean-square) behavior of the liquid crystal arranged in the matrix arrays and the power consumption is great to reduce the operating life of the battery.

It is, therefore, an object of the present invention to provide a method for driving a liquid crystal display matrix in a dynamic mode which overcomes the shortcomings encountered in the prior art.

It is another object of the present invention to provide a driver circuit for a liquid crystal display matrix by which the contrast ratio at a fixed viewing angle is increased.

It is another object of the present invention to provide a driver circuit arranged to drive a liquid crystal display matrix so as to minimize the power consumption.

It is still another object of the present invention to provide a driver circuit adapted to increase the operating life of a liquid crystal display matrix.

It is a further object of the present invention to provide a driver circuit arranged to drive a liquid crystal display matrix in a plural operating modes so as to maximise the contrast ratio in dependence on the ambient temperature variations.

It is a still further object of the present invention to provide a driver circuit for a liquid crystal display matrix, which circuit is simple in construction and highly reliable in operation.

These and other objects, features and advantages of the present invention will become more apparent from the following description when taken in conjunction with the accompanying drawings, in which:

FIG. 15B is a waveform diagram illustrating various drive signals obtained by the driver circuit shown in FIG. 11;

FIG. 17 is a timing chart for the waveforms to be used in a segment driver forming part of the driver circuit shown in FIG. 11;

FIG. 19 is a schematic view illustrating an example of a liquid crystal display device shown in FIG. 11;

FIGS. 25A and 25B show waveform diagrams illustrating the operation of the circuit of FIG. 21;

FIG. 31 is a detail circuitry for a controller shown in FIG. 30;

FIG. 32 is a schematic view illustrating various outputs of a ring counter shown in FIG. 30;

FIG. 34 is a waveform diagram showing digit drive signals obtained by the circuit of FIG. 27;

FIGS. 40A to 40E are views for illustrating the transition mode in the drive signals applied to the liquid crystal of FIG. 38;

FIG. 41 is a graph illustrating the experimental results of the power consumption; and FIG. 42 is a timing chart of digit and segment drive signals for illustrating a driving method of the present invention.

Before entering into a detailed discussion of the present invention, a brief explanation will be made to a prior art matrix driving method for a liquid crystal display device over which an improvement of the present invention is made.

In the matrix driving method, the root-mean-square voltage of a selected segment is determined in dependence on the number of rows of a display matrix and an output voltage of a power source. The root-mean-square voltage means an actual driving voltage at which liquid crystal attains a light scattering or a light transparent state, and has a significant influence on the display contrast of a liquid crystal display device as will be explained in detail below.

Figure 1:
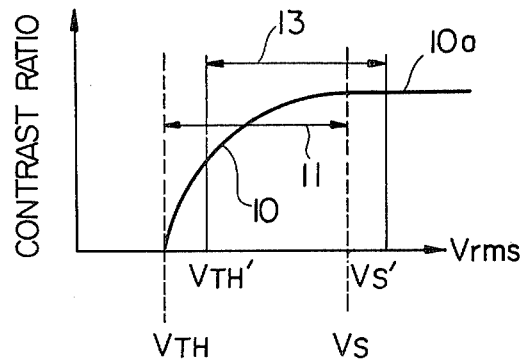
FIG. 1 is a graph illustrating the characteristics of the contrast ratio v.s. the root mean square voltage of a liguid crystal.

FIG. 1 shows the characteristic of the display contrast v.s. the root-mean-square voltage (Vrms) of the liquid crystal arranged in a matrix configuration. In FIG. 1, a reference numeral 11 indicates a range between the intrinsic root-mean-square voltages $V_{TH}$ and $V_S$ of the liquid crystal, and a reference numeral 13 indicates a range between the root mean square voltages $V'_{TH}$ and $V'_S$ determined by a driver circuit of the liquid crystal. The root-mean-square voltages $V'_{TH}$ and $V'_S$ will be referred to as $V_{off}$ and $V_{on}$ hereinafter. As shown, the liquid crystal is light transparent before the applied root-mean-square voltage reaches the so-called intrinsic optical threshold voltage $V_{TH}$. When the root-mean-square voltage exceeds beyond the threshold level $V_{TH}$ of the liquid crystal, the liquid crystal attains a light scattering state, and the display contrast increases as indicated by the curve 10. The display contrast reaches the saturation 10a when the root-mean-square voltage exceeds the intrinsic optical saturation voltage $V_S$. Although the liquid crystals have different contrast characteristics in dependence on the liquid crystal materials or the specific structures of molecule alignment, a so-called cross effect or crosstalk will occur in a case where the ratio of the saturation voltage $V_S$ to the threshold voltage $V_{TH}$ of the liquid crystal is large in value and the display matrix employing such a liquid crystal has a large number of rows of digit electrodes. This crosstalk effect reduces the display contrast very seriously as previously noted. An optimum display contrast can be obtained by selecting the root-means-square voltages $V_{off}$ and $V_{on}$ for the light transparent and light scattering states of the display device to values equal to the intrinsic threshold voltage $V_{TH}$ and the intrinsic saturation voltage $V_S$ of a particular liquid crystal used for such display device or by selecting the ratio of the root-mean-square voltage for the light scattering state to that for the light transparent state to be larger in value than $V_S/V_{TH}$. If the applied root-mean-square voltages for the light scattering state and the light transparent state reach the saturation voltage $V_{on}$ ($V'_S$) and the threshold voltage $V_{off}$($V'_{TH}$) which are higher than the intrinsic voltages $V_S$ and $V_{TH}$, respectively, the liquid crystal is driven in a range 13 in FIG. 1. In this situation, nonselected display elements will attain the slightly light scattering state, reducing the display contrast seriously. It is thus necessary to match the root-mean-square voltages $V'_{TH}$ and $V'_S$ to the intrinsic root-mean-square voltages $V_{TH}$ and $V_S$, respectively, such that the liquid crystal is driven in the range 11 in FIG. 1. In this case, the ratio of $V_{on}/V_{off}$ should be equal to or greater than $V_S/V_{TH}$, i.e., $V_{on}/V_{off} \geq V_S/V_{TH}$.

Figure 2:
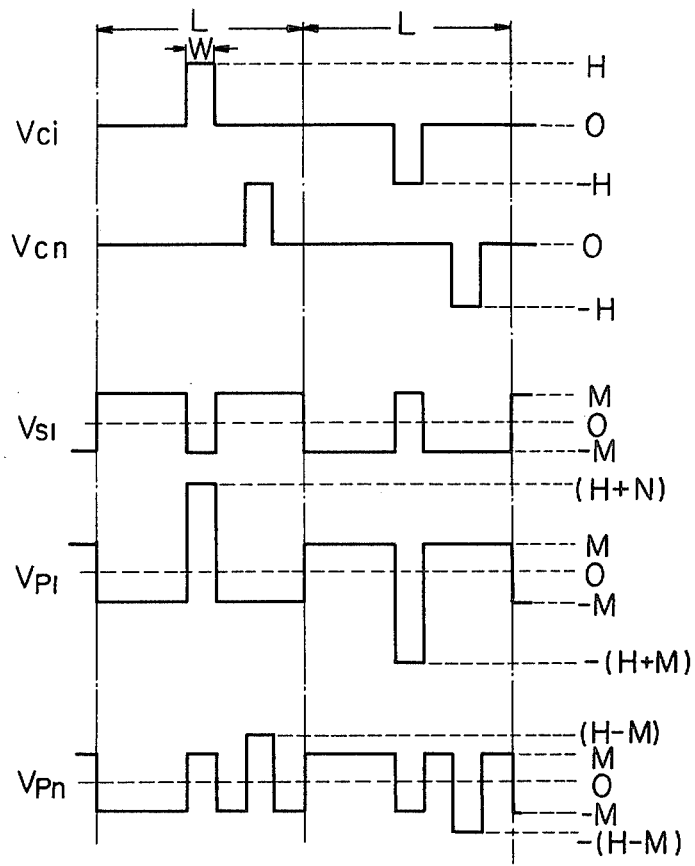
FIG. 2 is a waveform diagram showing a prior art matrix driving method.

FIG. 2 shows examples of waveforms of digit drive signals and segment drive signals proposed in a prior art matrix driving method for a liquid crystal display device. In FIG. 2, the waveform $V_{ci}$ represents a digit drive signal applied to an i-th digit electrode of the liquid crystal display device, and the waveform $V_{cn}$ represents a digit drive signal applied to an n-th digit electrode of the liquid crystal display device. As shown, the digit drive signals have the amplitudes H and −H and a duration W. These digit drive signals are applied to the digit electrodes of the liquid crystal display device at a repetition rate 2L. The waveforms $V_{sl}$ represents segment drive signals having the potentials M and −M applied to a segment electrode of the display device. The waveform $V_{pl}$ represents the potential difference across the digit electrode and the segment electrode by which a selected display segment attains a light scattering state, i.e., a visual state. The waveform $V_{pn}$ represents the potential difference between the digit electrode and the segment electrode by which the nonselected segment attains a light transparent state. The root-mean-square voltage $V_{on}$ at which the liquid crystal attains the light scattering state is expressed as:

$$V_{on} = \sqrt{\frac{1}{L} [\int \{\frac{L}{n} (H + M)^2 + \frac{nL - L}{n} M^2\} dt]}$$

where
L = half cycle time of the digit drive signal
n = the number of rows of the digit electrodes
H = the amplitude of the digit drive signal
M = the amplitude of the segment drive signal
t = time The root-mean-square voltage $V_{off}$ at which the liquid crystal attains the light transparent state is expressed as:

$$V_{off} = \sqrt{\frac{1}{L} [\int \{\frac{L}{n} (H - M)^2 + \frac{n - L}{n} M^2\} dt]}$$

Let us assume that M = 1 and L = 1. The above equations are written as:

$$V_{on} = \sqrt{\frac{1}{n}(H+1)^2 + \frac{n-1}{n}}$$

$$V_{off} = \sqrt{\frac{1}{n}(H-1)^2 + \frac{n-1}{n}}$$

It will thus be seen from the above equations that the root-mean-square voltages of the liquid crystal are determined by the ratio of the digit drive voltage v.s. the segment drive voltage, the absolute values of these voltages and the number of rows of the display matrix. In a conventional one-half-voltage biasing method, the amplitudes of the digit drive voltage and the segment drive voltage are selected to be equal to each other, i.e., H=M, and digit drive signals of duty 1/n are applied to the digit electrode of the liquid crystal. In this case, the half cycle time L is expressed by L = n × w where n is the number of rows of the digit electrodes, and w is the duration of the drive signal. In a conventional one-third-voltage biasing method, the amplitude of the digit drive voltage is selected to be twice that of the segment drive voltage, i.e., H = 2M. In this driving method, a voltage potential ±3M is applied to the liquid crystal during full excitation period, and a voltage potential ±M is applied during half excitation and unexcitation periods.

Figure 3:
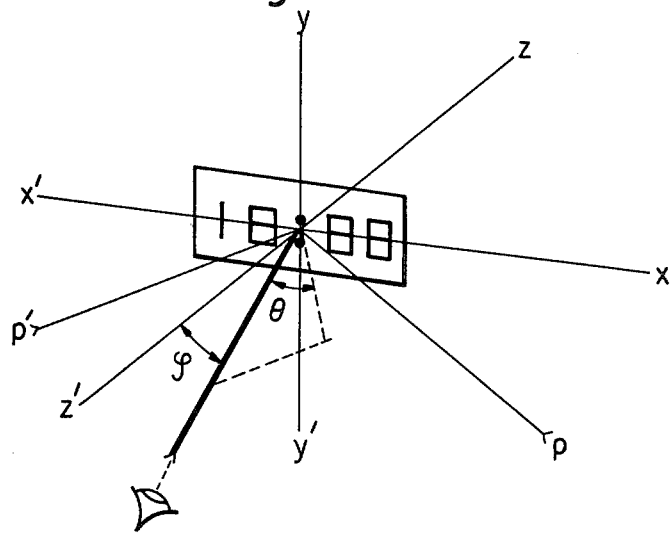
FIG. 3 is a schematic view illustrating the relationship between the contrast ratio and a viewing angle.
Figure 4:
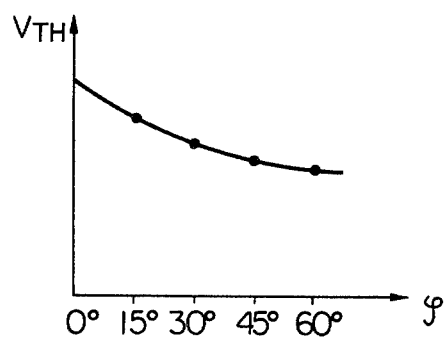
FIG. 4 is a graph showing the relationship between the optical threshold voltage and the viewing angle.

In a case where a drive voltage is applied to a liquid crystal display device using especially twisted nematic structure, the display state will change in dependence on the viewing angles. FIG. 3 shows a diagrammatic representation of the viewing angles for the display panel using the twisted nematic structure. In FIG. 3, when the display panel is viewed along the axis Z', the display states will be different from one another in cases where the viewing angle is aligned with the axis Z', i.e., $\theta = 90°$ and $\zeta = 0°$ and where the viewing angle is changed such that the angle $\theta$ is less than 90° and the angle $\zeta$ is increased with respect to the axis Z'. This problem is serious especially when the liquid crystal display device is driven by a matrix driving method. In this case, since the nonselected display elements are applied with a certain voltage potential, these display elements can undesirably be visible in a slightly light scattered state at certain viewing angles. FIG. 4 shows a graph in which optical threshold voltages $V_{TH}$ at which the nonselected display elements attain a light scattering state are plotted in terms of the angle $\zeta$ with respect to the axis Z'. Now assume that the display panel shown in FIG. 3 is viewed along the axis at an angle in a range determined by the axis P-P', i.e., $\zeta = \pm 60°$ and $\theta > 30°$. In this case, the nonselected display elements are visible as slightly light scattered state when the display device is driven by the conventional driving methods, resulting a lowered display contrast.

The present invention contemplates the provision of an improved driving circuit for a liquid crystal display matrix in which the display contrast remarkably increases and the nonselected display elements can attain a completely light transparent state. To this end, the present invention proposes to apply the reduced root-mean-square voltages to the liquid crystal display device without affecting the operating margin (i.e., the ratio of the root-mean-square voltage at which the liquid crystal attains a light scattering state to that at which the liquid crystal attains a light transparent state).

Figure 5:
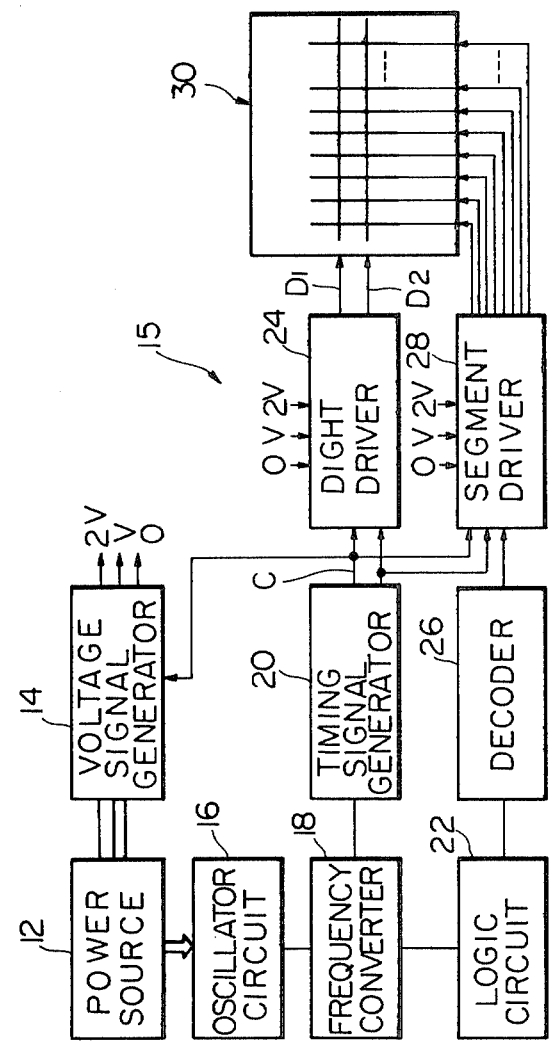
FIG. 5 is a block diagram of a first preferred embodiment of a driver circuit according to the present invention.

Referring to FIG. 5, there is shown a block diagram of a first preferred embodiment of a driver circuit according to the present invention. As shown, the driver circuit comprises a power source 12, which supplies output voltages to a voltage signal generator 14. The voltage signal generator 14 is arranged to generate various voltage signals at the potentials O, V and 2V in response to a control signal which will be described later. An oscillator circuit 16 may comprise a quartz crystal controlled oscillator which oscillates at a relatively high frequency. This high frequency signal is applied to a frequency converter 18 in the form of a divider which divides down the relatively high frequency signal to provide a relatively low frequency signal and a clock signal. The clock signal is applied to a timing signal generator 20, and the low frequency signal is applied to a logic circuit 22. The logic circuit 22 may comprise a calculator circuit adapted to perform arithmetic function in response to various output signals from a keyboard (not shown), or a time counter of an electronic timepiece. The logic circuit 22 generates display information signals which are applied to a decoder 26. The decoder 26 generates binary coded output signals which are applied to a segment driver 28, to which voltage signals are also applied from the voltage signal generator 14. The timing signal generator 20 is arranged to generate various timing signals and a control signal at predetermined frequencies in response to the clock signal from the frequency converter 18. The control signal C is applied to the voltage signal generator 14, which generates the various voltage signals at the potential O, V and 2V in response to the control signal as previously noted. These voltage signals are applied to a digit driver 24 and the segment driver 28 to which the control signal C is also applied.

Figure 6:
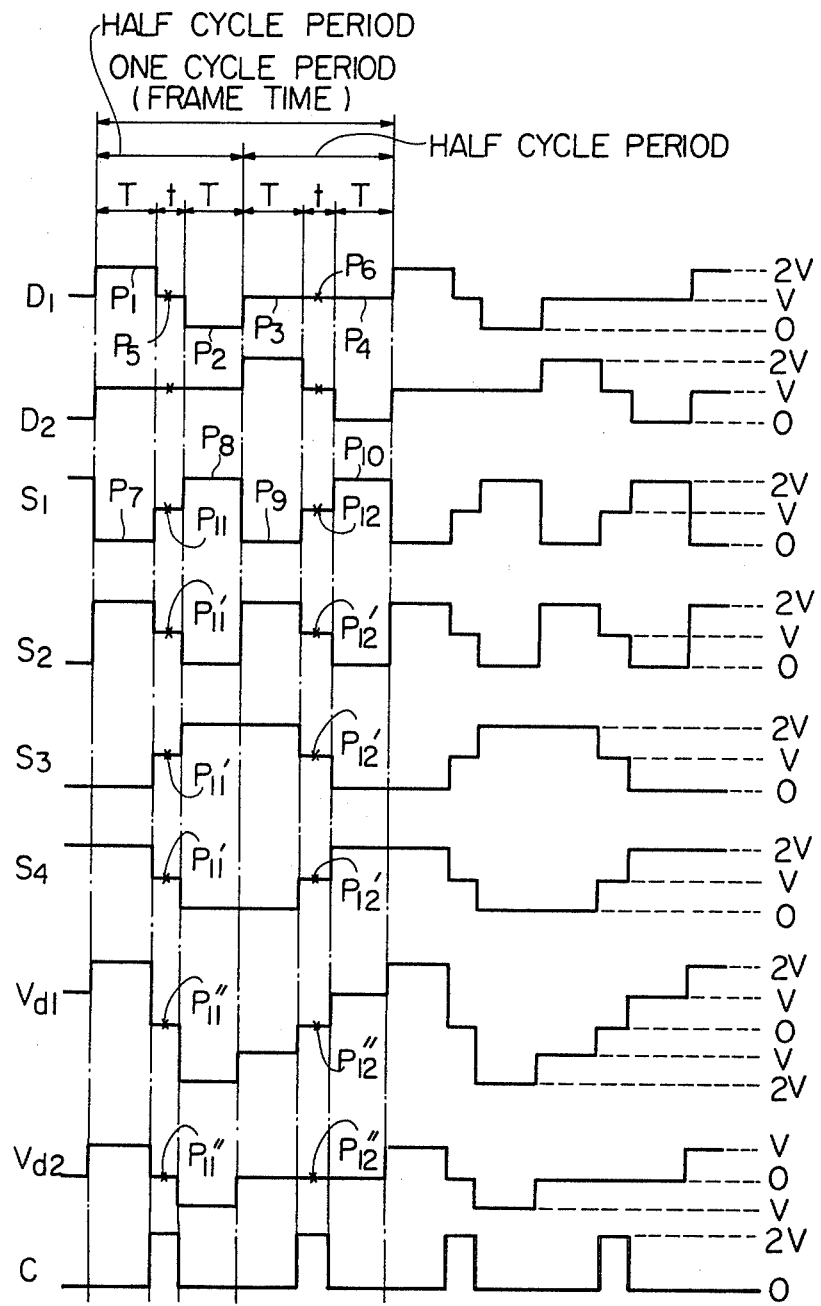
FIG. 6 is one example of a timing chart for the waveforms obtained by the circuit shown in FIG. 5.

The digit driver 24 generates digit drive signals $D_1$ and $D_2$ in response to the timing signals. These digit drive signals are displaced from each other by a predetermined time interval, i.e., a half cycle period of the digit drive signal as shown in FIG. 6. The digit drive signals are applied to digit electrodes of a liquid crystal display device 30 arranged in a matrix array. As shown in FIG. 6, each of the digit drive signals $D_1$ and $D_2$ varies at a plurality of voltage potentials, i.e., O, V and 2V during each frame time or one cycle period (4T + 2t) in a first predetermined sequence. More specifically, the digit drive signal $D_1$ is composed of first pulse components $P_1$ to $P_4$ of a first pulse width T and varying at the potentials O, V and 2V, and second pulse components $P_5$ and $P_6$ of a second pulse width t and fixed at the potential V. As shown in FIG. 6, each of the digit drive signals has at least one component having the pulse width t during each half cycle period (2T + t) in synchronism with the control signal C. It is to be noted that the ratio of t/T is set to a prescribed value in dependence on the relationship between the threshold voltages $V_{TH}$ and $V'_{TH}$ (see FIG. 1) and the ratio of t/T is preferably set to a greater value in a case where the differences between $V'_{TH}$ and $V_{TH}$ and between $V'_S$ and $V_S$ are large in value. It should further be noted that the one cycle period of the digit drive signal is set to a value to prevent flickering of the display. The digit drive signal $D_2$ is identical to the digit drive signal $D_1$ except that it is delayed in phase from the digit drive signal $D_1$ by the predetermined time interval as previously described.

The segment driver 28 generates various segment drive signals $S_1$, $S_2$, $S_3$ and $S_4$ varying at the potentials O, V and 2V in predetermined sequences. The segment drive signal $S_2$ is the inverse of the segment drive signal $S_1$ but is identical in phase therewith. Similarly, the segment drive signal $S_4$ is the inverse of the segment drive signal $S_3$ but is identical in phase therewith. As shown in FIG. 6, the segment drive signal $S_1$ is composed of first pulse components $P_7$ to $P_{10}$ varying at the potential O and 2V and having a pulse width T equal to the pulse width of the first pulse components $P_1$ to $P_4$ of the digit drive signal, and second pulse components $P_{11}$ and $P_{12}$ of the second pulse width $t$ equal to the second pulse width of the pulse components $P_5$ and $P_6$ of the digit drive signal. Each of the second pulse components $P_{11}$ and $P_{12}$ is at the same potential as the second pulse component $P_5$ and $P_6$ of the digit drive signal, i.e., at the potential V. In this manner, the segment drive signal $S_1$ has at least one second pulse component of a pulse width $t$ during each half cycle period in synchronism with the control signal C. Similarly, each of the segment drive signals $S_2$, $S_3$ and $S_4$ has a second pulse component $P'_{11}$ or $P'_{12}$ of a pulse width $t$ during each half cycle period in synchronism with the control signal C.

The digit drive signals $D_1$ and $D_2$ are applied to digit electrodes of the liquid crystal display device 30, and the segment drive signals $S_1$ to $S_4$ are applied to segment electrodes of the display device 30. In FIG. 6, the waveform $V_{d1}$ indicates the potential difference across the segment electrode and digit electrode $D_1$ in a case where the segment drive signal $S_3$ is applied to the segment electrode of display device 30. The waveform $V_{d2}$ indicates the potential difference across the segment electrode and digit electrode $D_2$ in a case where the segment drive signal $S_3$ is applied to the segment electrode of the display device 30. It will now be understood from these waveforms that the potential difference across the digit and segment electrodes becomes zero, as indicated by $P''_{11}$ or $P''_{12}$, in synchronism with the control signal C during each half cycle period whereby the root mean square voltage applied to the display element is reduced without causing a change in the operating margin of the liquid crystal for thereby remarkably increasing the display contrast.

Figure 7:
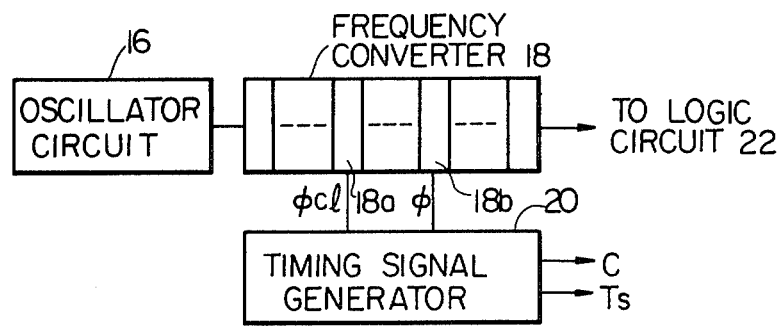
FIG. 7 is a schematic diagram showing one example of the connection between associated parts of the driver circuit shown in FIG. 5.

FIG. 7 shows an preferred example of the relationship between the frequency converter 18 and the timing signal generator 20 forming part of the driver circuit shown in FIG. 5. As shown, the timing signal generator 20 is connected at its input terminals to first and second intermediate stages 18a and 18b of the frequency converter 18 to receive clock signals $\phi_{cl}$ and $\phi$ of first and second frequencies, respectively. When $T > t$, the clock signal $\phi_{cl}$ is higher in frequency than the clock signal $\phi$. The timing signal generator 20 comprises a plurality of gate means (not shown) in which the clock signal $\phi_{cl}$ is used for determining the value of pulse width $t$ of the second pulse components contained in the drive signals (see FIG. 6) and the clock signal $\phi$ is used for determining the value of the pulse width T of the first pulse components contained in the drive signals. It will thus be seen that the ratio of t/T can be selected to a fixed value by selecting the frequencies of the clock signals $\phi_{cl}$ and $\phi$.

Figure 8:
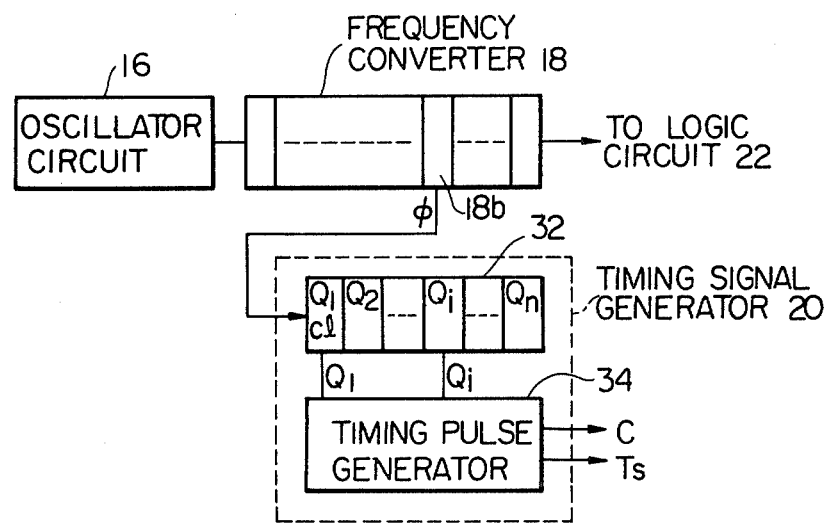
FIG. 8 is similar to FIG. 7 but shows another example of the connection between the associated parts.

FIG. 8 shows another preferred example of the relationship between the frequency converter 18 and the timing signal generator 20. In FIG. 8, the timing signal generator 20 comprises a count-by-n ring counter 32 connected at its clock input terminal to an intermediate stage 18b of the frequency converter 18, and a timing pulse generator 34 having its inputs coupled to $Q_1$ and $Q_i$ outputs of the ring counter 32. In this case, the output terminals of the ring counter 32 may be externally provided and the ratio of t/T can be determined to have various values by selectively connecting the output terminals.

Figure 9:
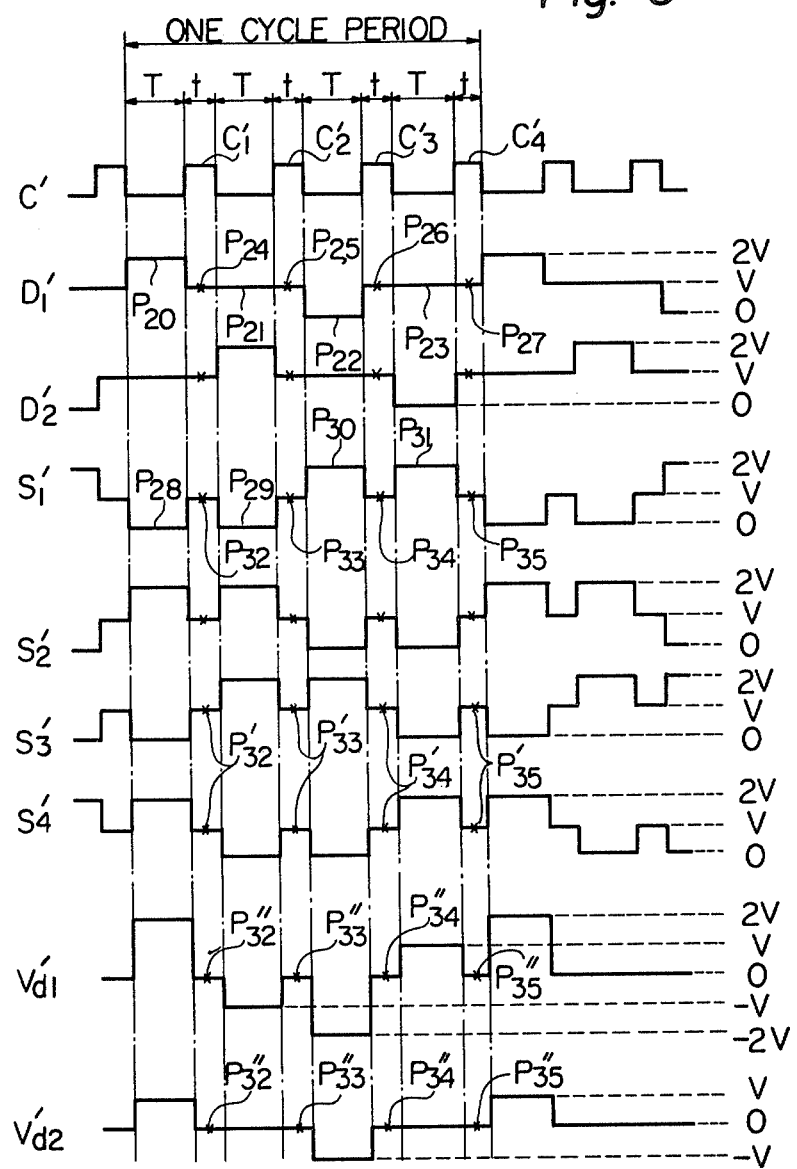
FIG. 9 is another example of a timing chart for the waveforms which can be obtained by the circuit shown in FIG. 5.

While, in the waveform diagram of FIG. 6, each of the digit drive signals and the segment drive signals has been shown as including first pulse components of the first pulse width T and containing a second pulse component of the second pulse width $t$ during each half cycle period, it should be noted that each of the drive signals may have more than one second pulse component of the pulse width $t$ during each half cycle period as shown in FIG. 9. In FIG. 9, the digit drive signal $D'_1$ is composed of first pulse components $P_{20}$ to $P_{23}$ having the pulse width T and second pulse components $P_{24}$ to $P_{27}$ having the pulse width $t$ during each frame time or one cycle period. The control signal C' is composed of four pulse components $C'_1$ to $C'_4$ during each cycle period. The digit drive signal $D'_2$ is identical to the digit drive signal $D'_1$ except that it is delayed in phase from the digit drive signal $D'_1$ by a predetermined time interval. Similarly, each of the segment drive signals $S'_1$ to $S'_4$ is composed of first pulse components $P_{28}$ to $P_{31}$ having the pulse width T and second pulse components $P_{32}$ to $P_{35}$ having the pulse width $t$. The second pulse components of each of the segment drive signals $S'_1$ to $S'_4$ are synchronized with the pulse components $C'_1$ to $C'_4$ of the control signal. Thus, the potential difference across the digit and segment electrodes becomes zero, as indicated by $P''_{32}$ to $P''_{35}$ in synchronism with the control signal C' and, therefore, the root mean square voltages applied to the display elements are reduced with a resultant increase in the display contrast.

Figure 10:
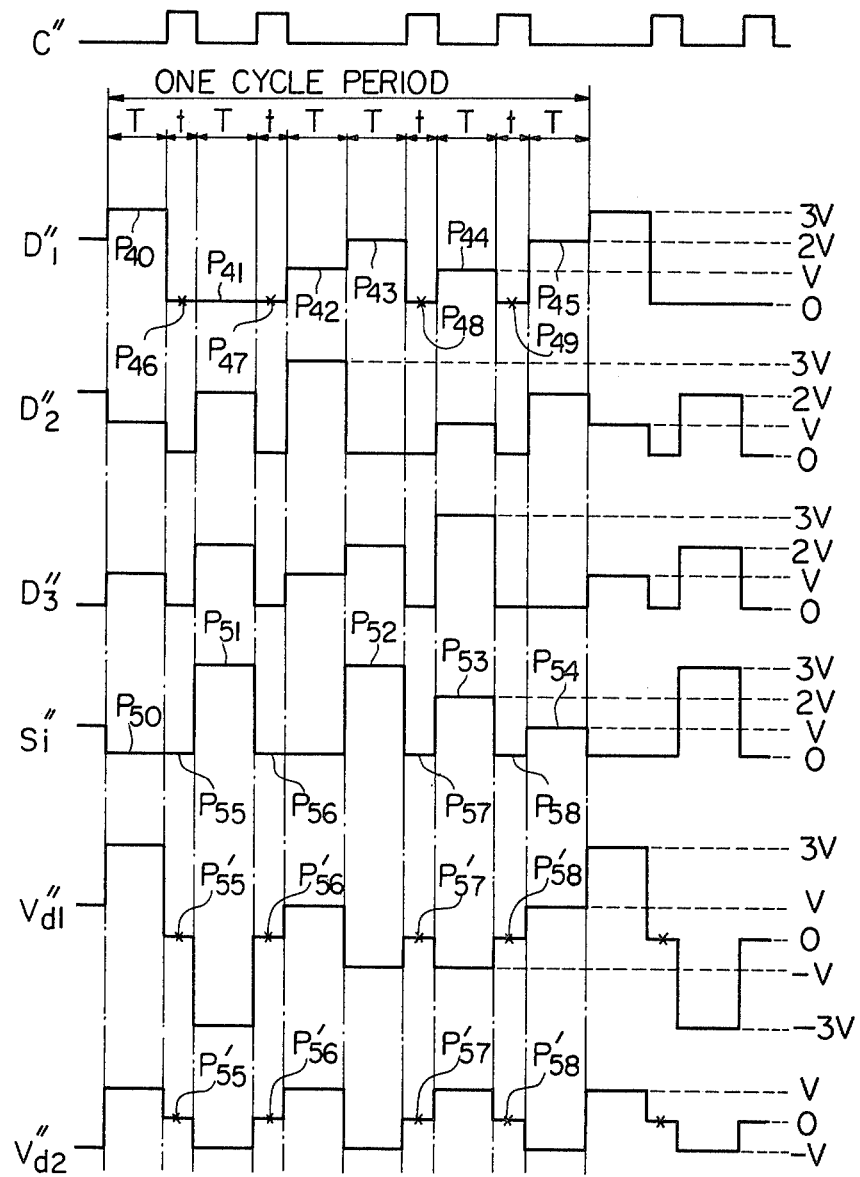
FIG. 10 is still another example of a timing chart for the waveforms which can be obtained by the circuit shown in FIG. 5.

FIG. 10 shows a waveform diagram of digit and segment drive signals in a case where the display matrix comprises three digit electrodes. In this case, the digit drive signal $D''_1$ is composed of first pulse components $P_{40}$ to $P_{45}$ varying at the potential O, V, 2V and 3V in a predetermined sequence and having the pulse width T, and second pulse components $P_{46}$ to $P_{49}$ having the pulse width $t$. The second pulse components $P_{46}$ to $P_{49}$ remain at the potential O in synchronism with the control signal C''. The digit drive signals $D''_2$ and $D''_3$ are identical to the digit drive signal $D''_1$ but delayed in phase therefrom by prescribed time intervals. The segment drive signal $S''_i$ is composed of first pulse components varying at the potentials O, V, 2V and 3V and having the pulse width T, and second pulse components having the pulse width $t$ equivalent to the pulse width of the second pulse components of the digit drive signal. While only one segment drive signal $S''_i$ is shown in FIG. 10 by way of example, it should be understood that more than one segment drive signal is utilized in actual practice and that each of the segment drive signals has a plurality of second pulse components having the pulse width $t$ in synchronism with the control signal C''. Consequently, the potential difference across the segment and digit electrodes becomes zero, as indicated by $P'_{55}$ and $P'_{58}$, in synchronism with the control signal C'', thereby reducing the root-mean-square voltages applied to the display elements. While, in FIGS. 6 and 9, the second pulse component has the potential V and, in FIG. 10, the second pulse component has the potential O, it should be noted that the second pulse component of the pulse width $t$ may have any of the voltage potentials.

Figure 11:
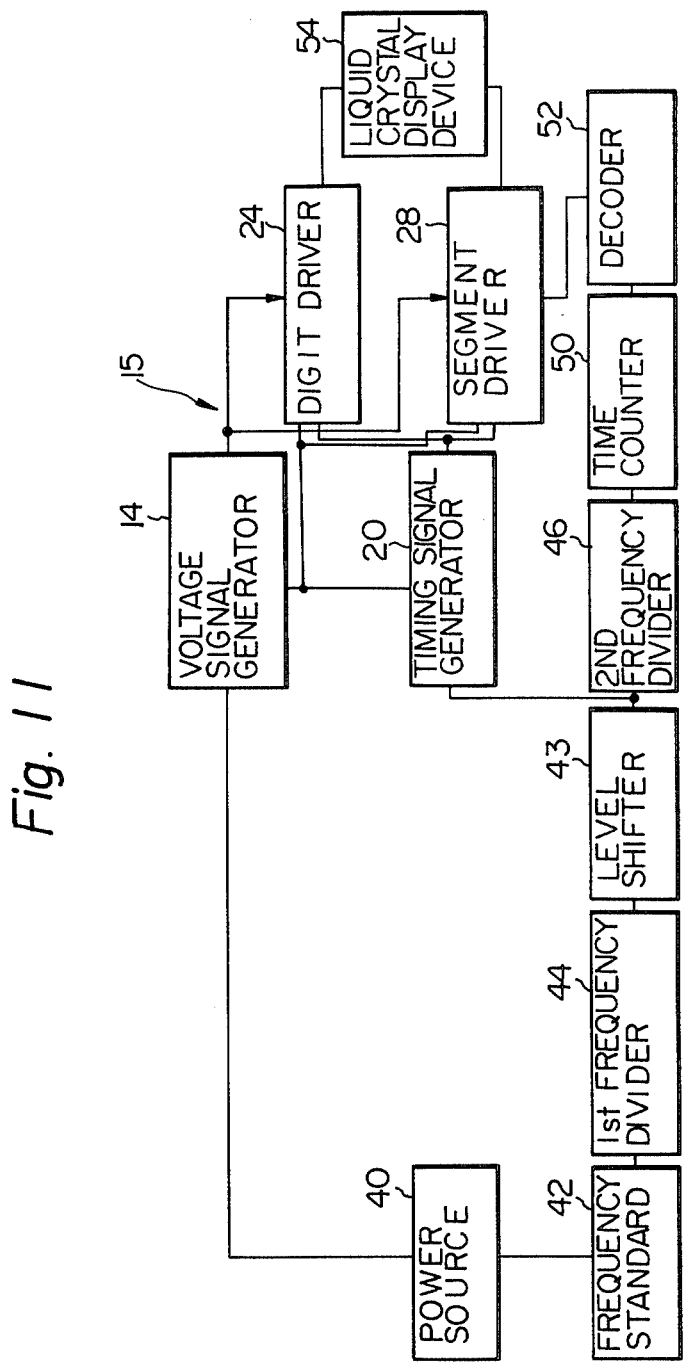
FIG. 11 is a block diagram of an example of an electronic timepiece incorporating a driver circuit according to the present invention.

FIG. 11 shows a block diagram of an electronic timepiece incorporating a driver circuit according to the present invention with like parts bearing like reference numerals as those used in FIG. 5. As shown, the electronic timepiece generally comprises a power source 40, a frequency standard 42 coupled to the power source 40, a first frequency divider 44 coupled to the frequency standard 42, a second frequency divider 46, a level shifter 48 coupled between the first and second frequency dividers 44 and 46, a time counter 50 coupled to the second frequency divider 46, a decoder 52 coupled to the time counter 50, a driver circuit 15 and a liquid crystal display device 54.

The frequency standard 42 comprises a quartz crystal controlled oscillator circuit which oscillates at a relatively high frequency. This relatively high frequency signal is applied to the first frequency divider 44, by which the relatively high frequency signal is divided down to a relatively low frequency signal. The relatively low frequency signal is applied through the level shifter 48 to the timing signal generator 20 of the driver circuit 15 and the second frequency divider 46. The second frequency divider 46 divides down the relatively low frequency signal to produce output signals of 1 Hz per second, which is applied to the time counter 50. The time counter 50 counts the output signals to produce display information signals indicative of time and calendar data. These display information signals are applied to the decoder 52, by which binary coded output signals are produced to cause the driver circuit 15 to drive the liquid crystal display device 54 so as to display time or calendar information.

Figure 12:
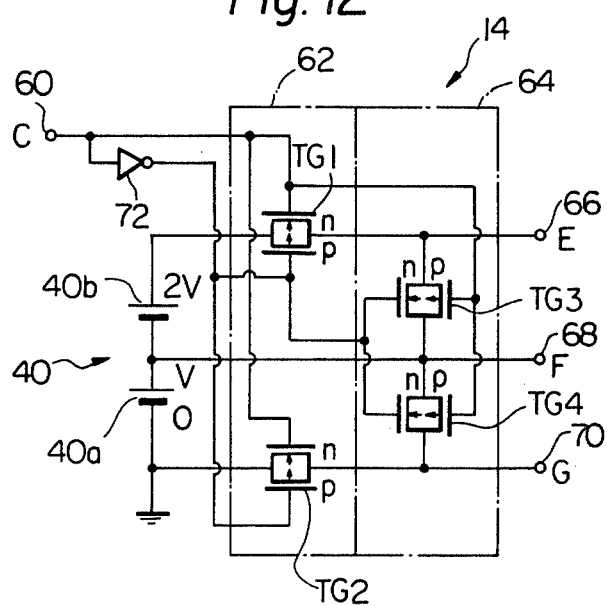
FIG. 12 is a preferred example of a voltage signal generator forming part of the driver circuit shown in FIG. 11.

FIG. 12 shows a detail circuitry for the voltage signal generator 14 forming part of the driver circuit shown in FIG. 11. In FIG. 12, the voltage signal generator 14 comprises a control terminal 60 adapted to receive a control signal C, and first and second electronic switching means 62 and 64 which operate in a complementary fashion to provide voltage signals to output terminals 66, 68 and 70 labeled as E, F and G. The first electronic switching means 62 comprises a first transmission gate TG1 coupled between the potential 2V, i.e., the positive potential side of a battery 40b connected in series with another battery 40a of the power source 40 and the output terminal 66, and a second transmission gate TG2 coupled between the potential O, i.e., the grounded side of the battery 40a and the output terminal 70. Each of the transmission gates TG1 and TG2 comprises a P-channel metal oxide semiconductor field effect transistor (MOSFET) having its gate terminal coupled through an inverter 72 to the control terminal 60, and an N-channel MOSFET having its gate terminal coupled to the control terminal 60. The source terminals of the transmission gate TG1 constitute an input which is coupled to the potential 2V, and drain terminals thereof constitute an output which is coupled to the output terminal 66. Likewise, the source terminals of the transmission gate TG2 constitute an input which is coupled to the potential O of the power source, and the drain terminals thereof constitute an output which is coupled to the output terminal 70. Similarly, the second electronic switching means 64 comprises a first transmission gate TG3 coupled between the potential V of the power source and the output terminal 66, and a second transmission gate TG4 coupled between the potential V of the power source 40 and the output terminal 70. The output terminal 68 is directly coupled to the potential V of the power source 40. Each of the transmission gates TG3 and TG4 comprises a P-channel MOSFET having its gate terminal coupled to the control terminal 60, and an N-channel MOSFET having its gate terminal coupled to the output of the inverter 72.

With the arrangement mentioned above, when the control signal C goes to a high level, the transmission gates TG1 and TG2 are turned on and the transmission gates TG3 and TG4 are turned off. In this case, the output terminals 66 and 70 are coupled to the potentials 2V and O, respectively, while the output terminal 68 is coupled to the potential V. Thus, the voltage signals E, F and G have the potentials 2V, V and O, respectively.

When the control signal C goes to a low level, the transmission gates TG3 and TG4 are turned on while the transmission gates TG1 and TG2 are turned off. In this condition, the output terminals 66 and 70 are not coupled to the potentials 2V and O, respectively, but are directly coupled to the potential V by the action of the transmission gates TG3 and TG4. Thus, all of the voltage signals E, F and G have the potential V at the same time as shown by the waveforms E, F and G in FIG. 13 when the control signal is at the low level.

Figure 14:
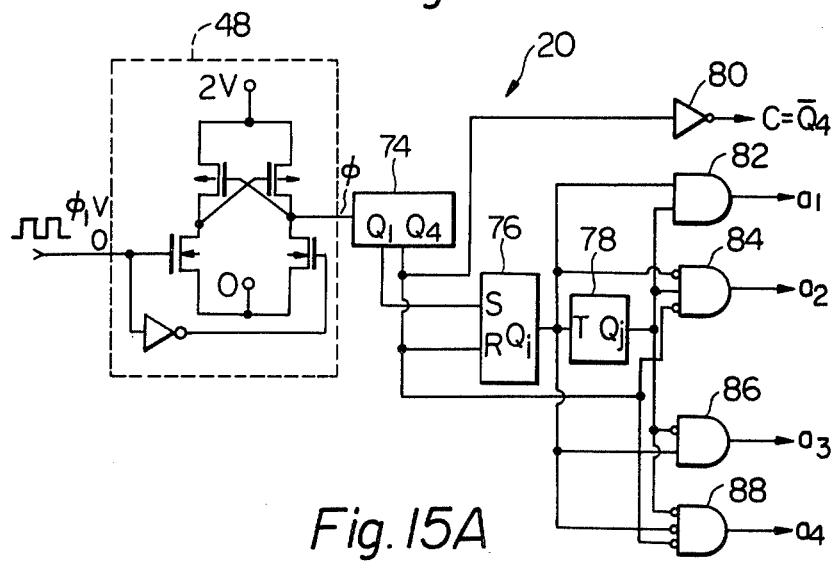
FIG. 14 is a preferred example of a timing signal generator forming part of the driver circuit shown in FIG. 11.

FIG. 14 shows a detail circuitry for the level shifter and the timing signal generator 20. The level shifter 48 comprises P-channel MOSFETs and N-channel MOSFETs arranged to convert the clock signal $\phi_1$ varying at the potential V and O from the first frequency divider 44 to a clock signal $\phi$ varying at the potentials O and 2V. The clock signal $\phi$ is applied to the timing signal generator 20. The timing signal generator 20 generally comprises a count-by-7 ring counter 74, an S-R type flip-flop 76, a divide-by-2 counter 78, an inverter 80, and AND gates 82, 84, 86 and 88.

The clock signal $\phi$ is applied to the ring counter 74 which generates output signals including outputs $Q_1$ and $Q_4$. The output $Q_4$ is applied to the inverter 80 which generates a control signal C which is the inverse of the output $Q_4$. The output $Q_1$ is connected to a set terminal of the flip-flop 76, to a reset terminal of which the $Q_4$ output is connected. The flip-flop 76 is set in synchronism with the rising edge of the output $Q_1$ and reset in synchronism with the rising edge of the output $Q_4$, producing an output $Q_i$. The output $Q_i$ is applied to inputs of the AND gates 82, 84, 86 and 88, and a triggering terminal of the divider 78. The output $Q_1$ is divided by 2 by the counter 78, which generates an output $Q_j$. The output $Q_j$ is applied to the other inputs of the AND gates 82, 84, 86 and 88. The output $\overline{Q}_4$ is also applied to the remaining inputs of the AND gates 84 and 88. The AND gates 82 generates an output $a_1$ in response to the outputs $Q_i$ and $Q_j$. The AND gates 84 generates an output $a_2$ in response to the outputs $\overline{Q}_i$, $Q_j$ and $\overline{Q}_4$. The AND gate 86 generates an output $a_3$ in response to the outputs $Q_i$ and $\overline{Q}_j$. The AND gate 88 generates an output $a_4$ in response to the outputs $\overline{Q}_i$, $\overline{Q}_j$ and $\overline{Q}_4$. The output generated by the control circuit 20 is shown in the timing chart of FIG. 15A. The control signal C is applied to the voltage signal generator, the digit driver 24 and the segment driver 28 to determine the pulse width t of the second pulse components contained in various drive signals as previously described. The outputs $a_1$ to $a_4$ are used as timing signals and applied to the digit driver 24 and the segment driver 28 to determine the pulse width T of the first pulse components contained in the various drive signals.

Figure 15A:
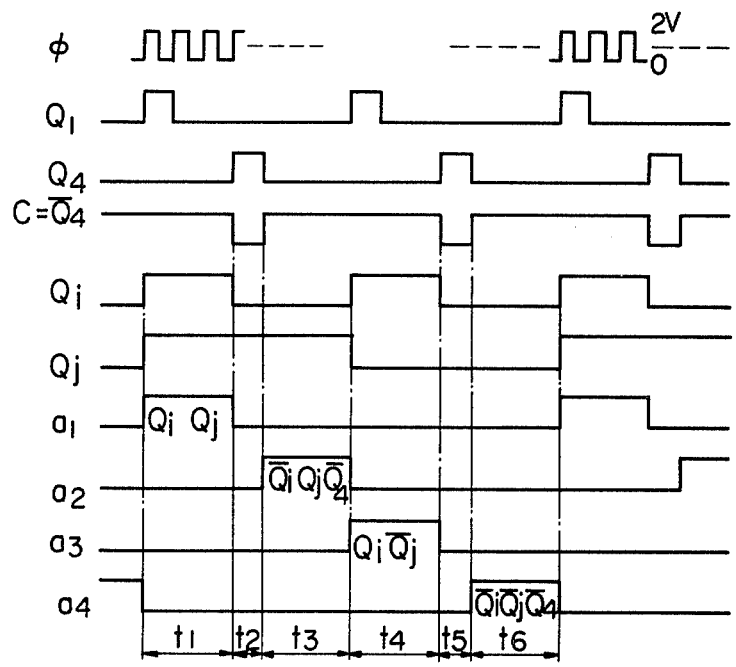
FIG. 15A is a timing chart for the waveforms obtained by the circuit shown in FIG. 14.
Figure 16:
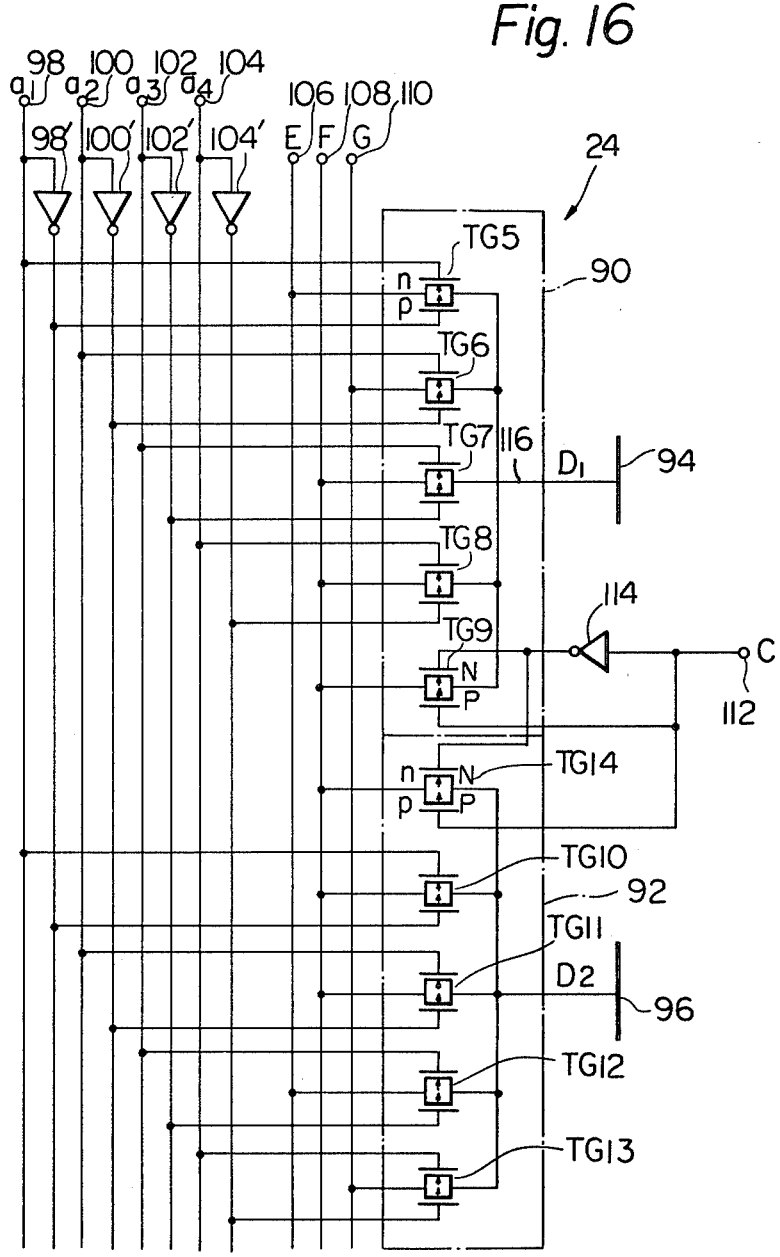
FIG. 16 is a preferred example of a digit driver arranged to generate digit drive signals shown in FIG. 15B.

FIG. 16 shows a detail circuitry for the digit driver 24 shown in FIG. 11. The digit driver 24 comprises first and second switching means 90 and 92 for generating digit drive signals $D_1$ and $D_2$ in response to timing signals $a_1$ to $a_4$ and the control signal C delivered from the timing signal generator 20. The first switching means 90 comprises first transmission gates TG5 to TG8 responsive to the timing signals $a_1$ to $a_4$ and a second transmission gate TG9 responsive to the control signal C. More specifically, each of the transmission gates comprises an N-channel MOSFET and a P-channel MOSFET. The gate terminals of the N-channel and P-channel MOSFETs are controlled by the timing signal. The source terminals of the transistors are coupled together and serve as an input which is applied with the voltage signal from the voltage signal generator 14. The drain terminals of the transistors are also coupled together and connected to a digit electrode 94 of the display device. The gate terminals of the N-channel MOSFETs of the transmission gates TG5 to TG8 are connected to first control terminals 98, 100, 102 and 104, respectively, which are labeled as $a_1$, $a_2$, $a_3$ and $a_4$ corresponding to the waveforms of FIG. 15. The gate terminals of the P-channel MOSFETs of the transmission gates TG5 to TG8 are coupled to outputs of inverters 98', 100', 102' and 104' having their inputs coupled to the corresponding control terminals. The inputs of the transmission gates TG5 and TG6 are coupled to input terminals 106 and 110, respectively, which are labeled as E and G. The inputs of the transmission gates TG7 and TG8 are coupled to the input terminal 108 labeled as F, to which an input of the second transmission gate TG9 is also coupled. The gate terminal of the P-channel MOSFET of the transmission gate TG9 is coupled to the second control terminal 112, while the gate terminal of the N-channel MOSFET is coupled to an output of an inverter 114 having its input coupled to the second control terminal 112. The outputs of the transmission gates TG5 to TG9 are coupled together as at 116 and connected to the first digit electrode 94.

Similarly, the second switching means 92 comprises first transmission gates TG10 to TG13 and a second transmission gate TG14. In the second switching means 92, the transmission gates TG12 and TG13 are coupled to the input terminals 106 and 110, respectively, while the inputs of the other transmission gates TG10, TG11 and TG14 are coupled to the input terminal 108. Thus, the digit drive signal $D_2$ is delayed in phase from the digit drive signal $D_1$ by a predetermined time interval as will be described later. The connections between the first transmission gates and the first control terminals are identical to those of the first switching means 90 and, therefore, a detailed description is herein omitted.

Figure 13:
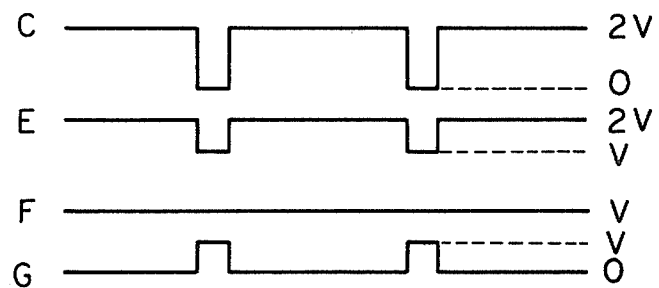
FIG. 13 is a timing chart for illustrating the operation of the circuit shown in FIG. 12.

The operation of the digit driver 24 will now be described with reference to FIGS. 13, 15A and 15B. During the time interval $t_1$, the control signal C remains at a high level so that the transmission gates TG9 and TG14 are turned off. As shown in FIG. 13, the voltage signals E, F and G are at the potentials 2V, V and O, respectively, when the control signal C is at the high level. During the time interval $t_1$, since the timing signal $a_1$ is at a high level, the transmission gates TG5 and TG10 are turned on while the remaining transmission gates are turned off. Under these conditions, the voltage signal E is applied to the digit electrode 94 so that the digit drive signal $D_1$ has the potential 2V. At the same time, the voltage signal F is applied to the digit electrode 96 so that the digit drive signal $D_2$ has the potential V, as shown in FIG. 15B.

During the time interval $t_2$, the control signal goes to a low level and the voltage signals E, F and G appearing at the input terminals 106, 108 and 110 have the potential V. In this instance, the transmission gates TG9 and TG14 of the first and second switching means are turned on while the remaining transmission gates of the first and second switching means are turned off. consequently, the voltage signal F is concurrently applied to both of the digit electrodes 94 and 96. Thus, the digit drive signals $D_1$ and $D_2$ have the same potential, i.e., the potential V during the time interval $t_2$.

During the time interval $t_3$, the control signal C goes to a high level, and the timing signal $a_2$ also goes to a high level. In this case, the transmission gates TG6 and TG11 are turned on while the remaining transmission gates are turned off. Under these conditions, the voltage signal G is applied to the digit electrode 94, and the voltage signal F is applied to the digit electrode 96. Thus, the digit drive signals $D_1$ and $D_2$ have the potentials O and V, respectively.

During the time interval $t_4$, the control signal C still remains at the high level, and the timing signal $a_3$ goes to a high level. Consequently, the transmission gates TG7 and TG12 are turned on, while the remaining transmission gates are turned off. Under these conditions, the voltage signals F and E are applied to the digit electrodes 94 and 96, respectively. Thus, the digit drive signals $D_1$ and $D_2$ have the potentials V and 2V.

During the time interval $t_5$, the control signal C goes to a low level and the transmission gates TG9 and TG14 are turned on while the remaining transmission gates are turned off. Thus, the digit drive signals $D_1$ and $D_2$ have the same potential, V, as previously noted with reference to the time interval $t_2$.

During the time interval $t_6$, the control signal goes to a high level, and the timing signal $a_4$ also goes to a high level. Consequently, the transmission gates TG8 and TG13 are turned on while the remaining transmission gates are turned off. Under these conditions, the voltage signals F and G are applied to the digit electrode 94 and 96, respectively. Thus, the digit drive signals $D_1$ and $D_2$ have potentials V and O, respectively.

It will now be understood that the digit drive signals $D_1$ and $D_2$ have the same potential at a predetermined time instant in synchronism with the control signal C during each half cycle period whereby the root-means-square voltage applied to the liquid crystal of the display device can be reduced to increase the display contrast in a manner as previously noted.

FIG. 17 shows a timing chart illustrating a method of generating timing signals for use in the segment driver 28 shown in FIG. 11. The waveform $Q_i$ indicates the output from the ring counter 74 shown in FIG. 14. The waveform $Q_i$ indicates the output of the flip-flop 76. The waveform $\overline{C}$ corresponds to the output $Q_4$ from the ring counter 74. The waveform $Q_k$ is obtained by inputing the output $\overline{C}$ and the output $Q_i$ to an OR gate. The waveform $Q_j$ is the output from the divider 78, and will be referred to as a timing signal Z hereinafter. The waveforms X and Y vary between the potential O and 2V and have the potential V during the time intervals $t_2$ and $t_5$. These waveforms may be obtained with the use of a circuit arrangement similar to that shown in FIG. 16, and will also be referred to as timing signals hereinafter. In this case, the circuit arrangement may be constructed such that the timing signal has the potentials 2V, O, 2V and O in synchronism with the timing signals $a_1$ to $a_4$ shown in FIG. 15A.

Figure 18:
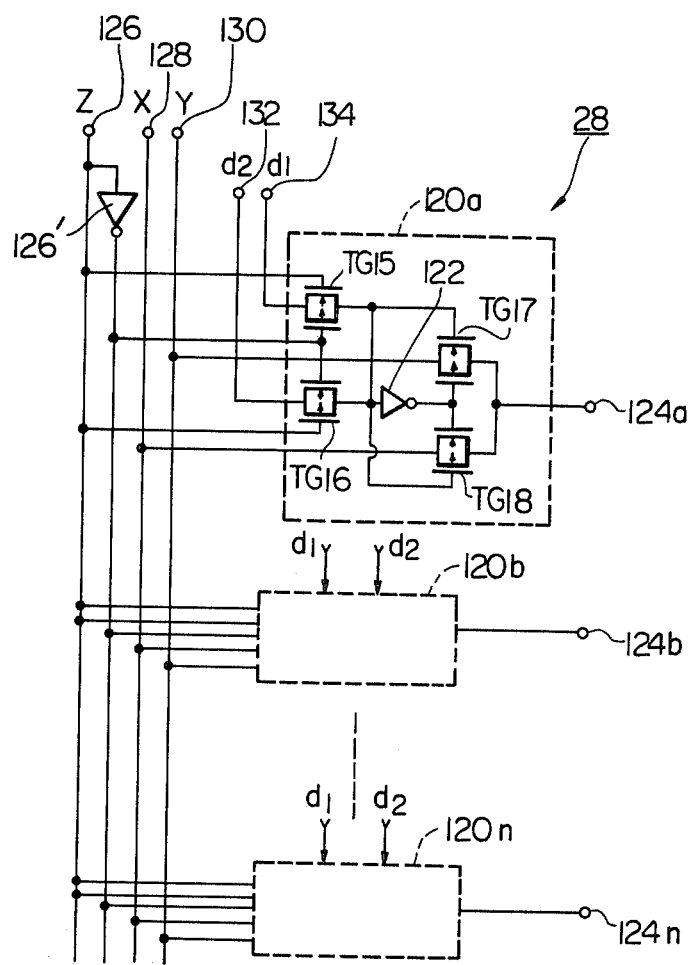
FIG. 18 is a preferred example of the segment driver to generate segment drive signals shown in FIG. 15B.

FIG. 18 shows a detail circuitry for the segment driver 28 forming part of the driver circuit 15 shown in FIG. 11. The segment driver 28 comprises a plurality of switching means 120a, 120b, ... and 120n connected to output terminals 124a, 124b, ... and 124n which in turn are connected to the segment electrodes of the display device 54 (see FIG. 11). As the switching means are identical, only the switching means 120a will be described. The switching means comprises transmission gates TG15 to TG18 and an inverter 122. Each of the transmission gates comprises an N-channel MOSFET and a P-channel MOSFET. The gate terminal of the N-channel MOSFET of the transmission gate TG15 is coupled to a control terminal 126 labeled as Z, to which the gate terminal of the P-channel MOSFET of the transmission gate TG16 is also connected. The gate terminals of the P-channel and N-channel MOSFETs of the transmission gates TG15 and TG16 are coupled via an inverter 126' to the control terminal 126. The inputs of the transmission gates TG15 and TG16 are coupled to second control terminals 132 and 134 labeled as $d_2$ and $d_1$, respectively. The symbols $d_1$ and $d_2$ represent the output signals from the decoder 52 shown in FIG. 11. The gate terminal of the N-channel MOSFET of the transmission gate TG17 is connected to the outputs of the transmission gates TG15 and TG16 to which the gate terminal of the P-channel MOSFET of the transmission gate TG18 is also connected. The gate terminals of the P-channel MOSFET of the transmission gate TG17 and the gate terminal of the N-channel MOSFET of the transmission gate TG18 are coupled via an inverter 122 to the outputs of the transmission gates TG15 and TG16. The outputs of the transmission gates TG17 and TG18 are coupled together and connected to the output terminal 124a.

The relationship between the decocer's output $d_1$ and $d_2$ and the voltage potentials of segment drive signals appearing at the output terminal 124a is shown in the following Table I:

Table I

| TIME INTERVAL | $d_1 d_2$ HH | $d_1 d_2$ LL | $d_1 d_2$ HL | $d_1 d_2$ LH |
|---|---|---|---|---|
| $t_1$ | O | 2V | O | 2V |
| $t_2$ | V | V | V | V |
| $t_3$ | 2V | O | 2V | O |
| $t_4$ | O | 2V | 2V | O |
| $t_5$ | V | V | V | V |
| $t_6$ | 2V | O | O | 2V |

In the above Table I, the symbols "O", "V" and "2V" indicate the voltage potentials of the segment drive signals, the symbols $d_1$ and $d_2$ denote the decoder's outputs, and the symbols "H" and "L" denote the high and low logic levels of the decoder's outputs.

The operation of the segment driver 28 will now be described with reference to the above Table I and FIGS. 17 and 18. Assume that both of the decoder's output $d_1$ and $d_2$ go to a high level during the time intervals $t_1$ to $t_6$. During the time intervals $t_1$, $t_2$ and $t_3$, the timing signal Z goes to a high level and, therefore, the transmission gate TG15 is turned on while the transmission gate TG16 is turned off. In this case, the decoder's output $d_1$ is applied to the transmission gate TG17, which is consequently turned on. Thus, the signal Y appearing at the input terminal 130 is passed through the transmission gate TG17 to the output terminal 124a. As previously noted, since the signal Y varies at the potentials O, V and 2V during the time intervals $t_1$, $t_2$ and $t_3$, respectively, an output voltage applied to the corresponding segment of the display device via the output terminal 124a varies at the same potentials as the signal Y as shown in the above Table I. During the time intervals $t_4$, $t_5$ and $t_6$, the timing signal Z goes to a low level and, therefore, the transmission gate TG16 is turned on while the transmission gate TG15 is turned off. In this case, the decoder's output $d_2$ is passed through the transmission gate TG16 and the inverter 122 to the transmission gate TG17, which consequently remains in its turned on condition. Thus, the signal Y appearing at the input terminal 130 is applied through the transmission gate TG17 to the output terminal 124a. In these instances, since the signal Y varies at the potentials O, V and 2V, the output voltage applied to the segment electrode of the display device varies at the potentials O, V and 2V as indicated in the above Table I.

It will thus be seen that when both of the decoder's output $d_1$ and $d_2$ go to a high level, the segment drive signal varies as shown by the waveform $S_1$ in FIG. 15B. In this case, two segments arranged in a matrix array will attain a light scattering state. When both of the outputs $d_1$ and $d_2$ go to a low level, the segment drive signal varies as shown by the waveform $S_2$ in FIG. 15B and, in this case, both of the segments will attain a light transparent state. When the output $d_1$ goes to a high level while the output $d_2$ remains in the low level, the segment drive signal varies as shown by the waveform $S_3$ in FIG. 15B. In this case, one of the segments will attain a light scattering state while the other segment will attain a light transparent state. When the output $d_2$ goes to a high level while the output $d_1$ remains in the low level, the segment drive signal varies as shown by the waveform $S_4$. In this case, one of the segments will attain a light transparent state while the other segment will attain a light scattering state.

It will be appreciated from FIG. 15B that the digit drive signals $D_1$ and $D_2$ and the segment drive signals $S_1$ to $S_4$ have the same potentials during the time intervals $t_2$ and $t_5$ whereby the potentials difference across the electrodes will become zero level and, therefore, the root mean square voltage applied to the liquid crystal will be reduced to increase the display contrast as previously described hereinabove. It will further be noted that in FIG. 15B the ratio t/T is equal to ⅓.

FIG. 19 shows a detail circuit connection for the digit electrodes and the segment electrodes of the display device 54 shown in FIG. 11. In FIG. 11, the display device 54 comprises digit electrodes 140 and 142 connected to input terminals labeled $D_1$ and $D_2$, respectively, and a plurality of groups of segment electrodes 144, 146, 148 and 150 connected to input terminals labeled $S_a$, $S_b$, $S_c$ and $S_d$, respectively, to which the segment drive signals appearing at the output terminals of the segment driver 28 of FIG. 18 are applied. The display device 54 is shown as composed of a minutes display section 152, a colon display section 154 and an hours display section 156 but may have additional display sections such as seconds such as seconds display section or dates display station, if desired.

The relationship between the displayed data and the decoder's output $d_1$ and $d_2$ is illustrated in the following Table II:

Table II

| DISPLAYED DATA | $S_a$ $d_1 d_2$ | $S_b$ $d_1 d_2$ | $S_c$ $d_1 d_2$ | $S_d$ $d_2$ |
|---|---|---|---|---|
| 0 | HH | HL | HH | H |
| 1 | LL | HL | HL | L |
| 2 | HL | HH | LH | H |
| 3 | HL | HH | HL | H |

Table II-continued

| DISPLAYED DATA | $S_a$ $d_1 d_2$ | $S_b$ $d_1 d_2$ | $S_c$ $d_1 d_2$ | $S_d$ $d_2$ |
|---|---|---|---|---|
| 4 | LH | HH | HL | L |
| 5 | HH | LH | HL | H |
| 6 | HH | LH | HH | H |
| 7 | HL | HL | HL | L |
| 8 | HH | HH | HH | H |
| 9 | HH | HH | HL | H |

As seen from the above Table II, the numeral "1" is displayed by the display device 54 shown in FIG. 19 when both of the decoder's outputs $d_1$ and $d_2$ for the input terminal $S_a$ go to a low level, the outputs $d_1$ and $d_2$ for the input terminals $S_b$ and $S_c$ go to high and low levels, and the output $d_2$ for the input terminal $S_d$ goes to a low level. In this manner, the display data will change in dependence on the logic levels of the decoder's outputs $d_1$ and $d_2$ applied to switching means 120a, 120b, . . . and 120n of the segment driver 28 shown in FIG. 18.

Figure 20:
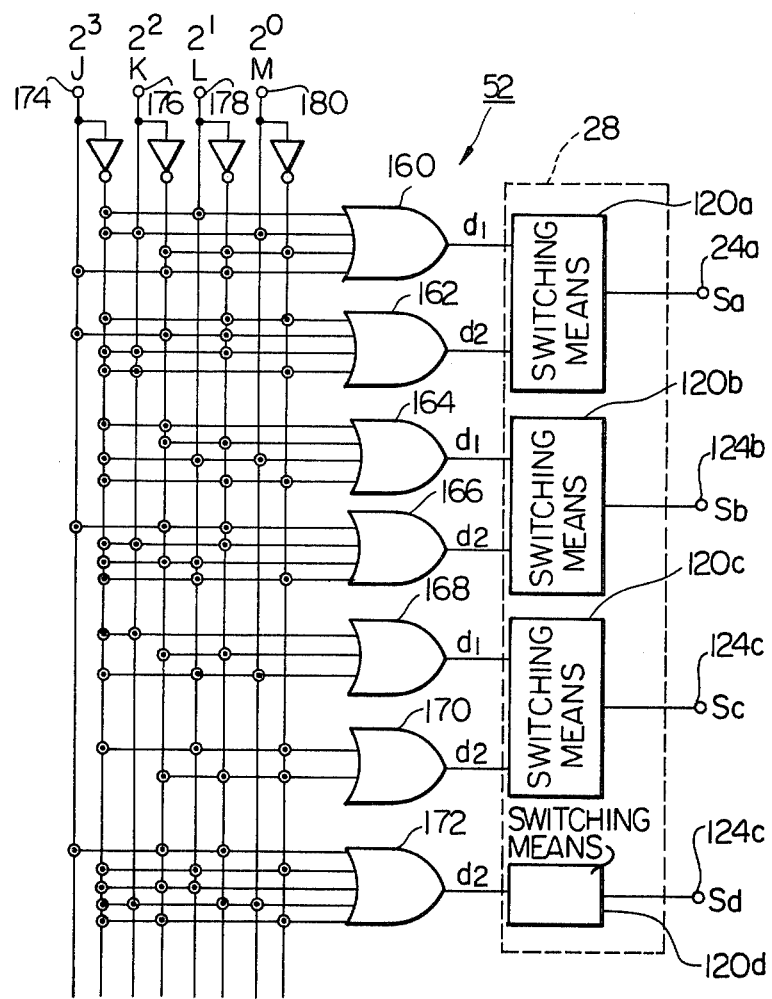
FIG. 20 is a preferred example of a decoder shown in FIG. 11.

FIG. 20 illustrates an example of the decoder 52 which includes OR gates 160, 162, 164, 166, 168, 170 and 172 adapted to provide decoded outputs. As shown, the decoder 52 has input terminals 174, 176, 178 and 180 to receive output signals J,K,L and M from the time counter 50 shown in FIG. 11, representing bit weights of $2^3$, $2^2$, $2^1$ and $2^0$, respectively. The OR gate 160 has a first input adapted to receive the product of signals $\overline{J}$ and L, a second input adapted to receive the product of signals $\overline{J}$, K and M, a third input adapted to receive the product of signals $\overline{K}$, $\overline{L}$ and $\overline{M}$, and a fourth input adapted to receive the product of signals J, $\overline{K}$ and $\overline{L}$. The outputs $d_1$ and $d_2$ from the OR gates 160 and 162 are applied to the switching means 120a of the segment driver 28 which generates a segment drive signal in a manner as already described above. This segment drive signal is applied to an input terminal 124a labeled $S_a$ corresponding to the input terminal of the segment electrode 144 of FIG. 19. In this case, the outputs $d_1$ and $d_2$ from the OR gates 160 and 162 are expressed as:

$$d_1 = \overline{J}L + \overline{J}KM + \overline{K}\overline{L}\overline{M} + J\overline{K}\overline{L}$$

$$d_2 = \overline{J}L\overline{M} + J\overline{K}\overline{L} + \overline{J}K\overline{L} + \overline{J}KM$$

Similarly, the outputs $d_1$ and $d_2$ applied to the switching means 120b are expressed as:

$$d_1 = \overline{J}K + \overline{K}\overline{L} + \overline{J}LM + J\overline{L}\overline{M}$$

$$d_2 = J\overline{K}\overline{L} + \overline{J}K\overline{L} + \overline{J}\overline{K}L + \overline{J}L\overline{M}$$

Likewise, the outputs $d_1$ and $d_2$ applied to the switching means 120c are expressed as:

$$d_1 = \overline{J}K + \overline{K}\overline{L} + \overline{J}LM$$

$$d_2 = \overline{K}\overline{L}\overline{M} + \overline{J}L\overline{M}$$

The output $d_2$ applied to the switching means 120d is expressed as:

$$d_2 = J\overline{K}\overline{L} + \overline{J}L\overline{M} + \overline{J}\overline{K}L + Jk\overline{L}\overline{M} + \overline{J}KM$$

Figure 21:
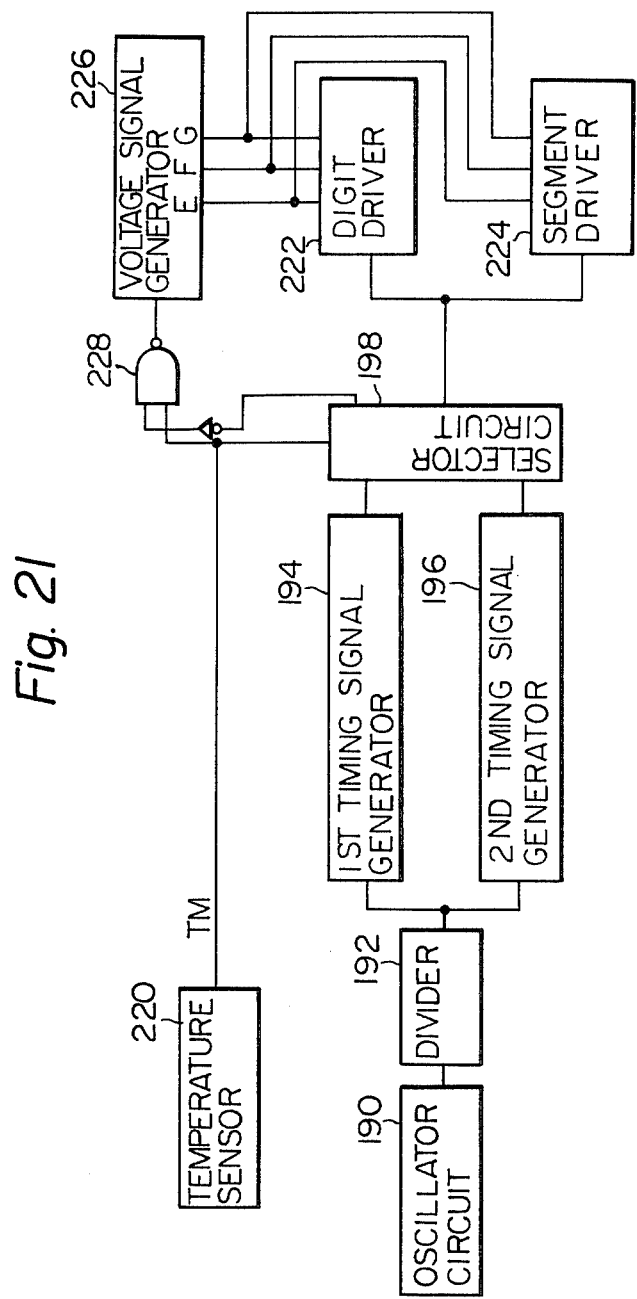
FIG. 21 is a block diagram of a second preferred embodiment of a driver circuit according to the present invention.

FIG. 21 shows a second preferred embodiment of the driver circuit according to the present invention. In FIG. 21, a reference numeral 190 designates an oscillator circuit which provides a relatively high frequency signal, which is applied to a frequency divider 192. The frequency divider 192 divides down the relatively high frequency signal to produce a relatively low frequency signal, which is applied to first and second timing signal generators 194 and 196. The first timing signal generator 194 may have the same circuit arrangement as that shown in FIG. 14 and, therefore, a detailed description of the same is omitted. The first timing signal generator 194 generates a control signal C and a plurality of timing signals $a_1$, $a_2$, $a_3$ and $a_4$, which are applied to a selector circuit 198.

Figure 22:
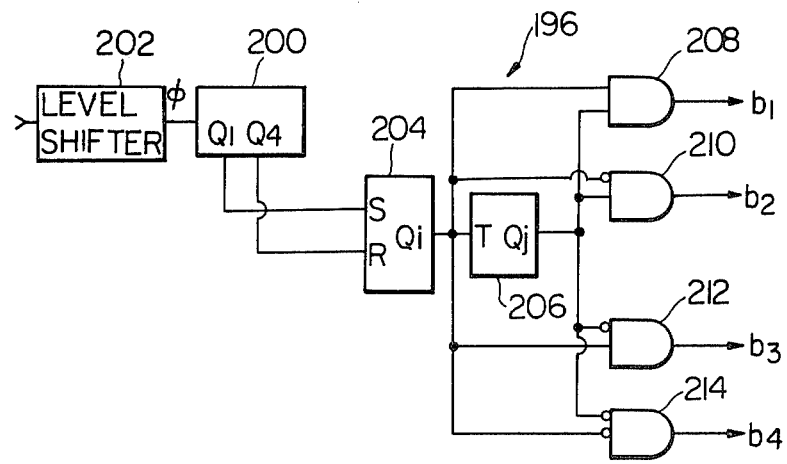
FIG. 22 is a detail circuitry for a timing signal generator forming part of the driver circuit of FIG. 21.
Figure 23:
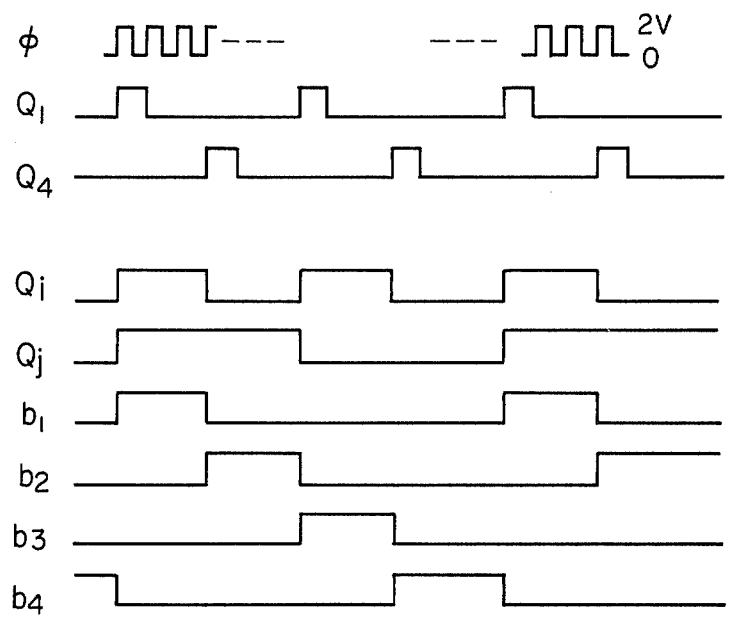
FIG. 23 is a timing chart for the waveforms obtained by the circuit of FIG. 22.

As shown in FIG. 22, the second timing signal generator 196 comprises a count-by-6 ring counter 200 connected at its input coupled to the frequency divider 192 via a level shifter 202 to receive a clock signal $\phi$. The $Q_1$ output of the ring counter 200 is coupled to a set terminal S of an S-R flip-flop 204, whose reset terminal R is coupled to the $Q_4$ output of the ring counter 200. The $Q_1$ output of the flip-flop 204 is coupled to inputs of AND gates 208, 210, 212 and 214, and an input of a divide-by-2 counter 206. The $Q_j$ output of the counter 206 is connected to the other inputs of the AND gates 208, 210, 212 and 214. These AND gates 208, 210, 212 and 214 generate timing signal $b_1$, $b_2$, $b_3$ and $b_4$, respectively, in a manner as shown by the waveforms in FIG. 23. It will be seen in FIG. 23 that the timing signals $b_2$, $b_3$ and $b_4$ rise in synchronism with the falling edges of the timing signals $b_1$, $b_2$ and $b_3$, respectively. The timing signals thus produced are applied to the selector circuit 198.

The selector circuit 198 is connected to a temperature sensor 220 to receive a temperature signal TM therefrom. The temperature sensor 220 is arranged to detect the ambient temperature and generate the temperature signal TM which goes to a high level when the ambient temperature exceeds a predetermined level, i.e., 20° C and goes to a low level when the ambient temperature decreases below the predetermined level. The selector circuit 198 functions to select the timing signals to be applied to digit driver 222 and segment driver 224 in response to the temperature signal TM. The digit driver 222 and segment driver 224 may be arranged in the same construction as those shown in FIGS. 16 and 18, respectively. The digit driver 222 and the segment driver 224 are adapted to receive voltage signals E, F and G from a voltage signal generator 226, to which a control signal C from the first control circuit 194 is gated through a NAND gate 228 when the temperature signal TM goes to a high level.

The voltage signal generator 226 may comprise the same circuit arrangement as that shown in FIG. 12.

When the ambient temperature is below the predetermined level, the temperature signal TM goes to a low level. Therefore, the NAND gate 228 is inhibited and the output thereof goes to a high level so that the switching circuit 226 generates voltage signals E, F and G at the potentials 2V, V and O, respectively. When the ambient temperature exceeds the predetermined level, the temperature signal goes to a high level opening the NAND gate 228 to allow the control signal C from the first control circuit 194 to the switching circuit 226. In this case, the switching circuit 226 generates the voltage signals E, F and G as shown in FIG. 13. It will thus be seen that when the ambient temperature is below the predetermined level the digit and segment drivers 222 and 224 generate drive signals which increase the root-mean-square voltages applied to the liquid crystal.

Figure 24:
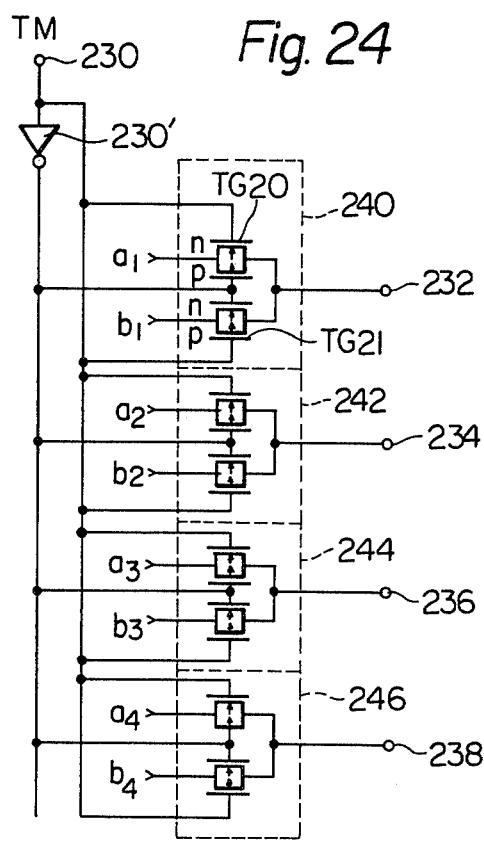
FIG. 24 is a detail circuitry for a selector circuit forming part of the circuit of FIG. 21.

FIG. 24 shows an example of a detail circuitry for the selector circuit 198 shown in FIG. 21. As shown, the selector circuit 198 has a control terminal 230 to which the temperature signal TM from the temperature sensor 220 is applied, and a plurality of output terminals 232 to 238 connected to the digit driver 222 and the segment driver 224. The switching means are identical and, therefore, a description will be given only to the switching means 240. The switching means 240 comprises first and second transmission gates TG20 and TG21 having their inputs adapted to receive the timing signals $a_1$ and $b_1$, respectively, which are applied from the first and second timing signal generators 194 and 196 (see FIG. 21). The gate terminal of the N-channel MOSFET of the transmission gate TG20 is connected to the control terminal 230, to which the gate terminal of the P-channel MOSFET of the transmission gate TG21 is also connected. The gate terminal of the P-channel MOSFET of the transmission gate TG20 and the gate terminal of the N-channel MOSFET of the transmission gate TG21 are coupled together and connected the control terminal 230 via an inverter 230'.

With this arrangement, when the temperature signal TM goes to a low level, the transmission gate TG21 is turned on while the transmission gate TG20 is turned off. In this instance, the timing signal $b_1$ from the second control circuit 196 is applied to the output terminal 232. When the temperature signal TM goes to a high level, the transmission gate TG20 is turned on while the transmission gate TG21 is turned off to pass the timing signal $a_1$ from the first control circuit 194 to the output terminal 232. In this manner, the selector circuit 198 passes the timing signals $b_1$, $b_2$, $b_3$ and $b_4$ from the second timing signal generator 196 to the digit driver 222 and the segment driver 224 when the ambient temperature is below the predetermined level. When the ambient temperature exceeds the predetermined level, the selector circuit 198 passes the timing signals $a_1$, $a_2$, $a_3$ and $a_4$ from the first timing signal generator 194 to the digit driver 222 and the segment driver 224. It should be noted that when the timing signals are used the waveforms X and Y shown in FIG. 17 are modified such that they vary between the potentials O and 2V and have no intermediate voltage potential during the time intervals $t_2$ and $t_5$. The digit driver 222 and the segment driver 224 generate digit and segment drive signals as shown by the waveforms in FIG. 25A in response to the timing signals $b_1$ to $b_4$ when the ambient temperature is below the predetermined level. In this case, the drive signals have no second pulse components ($t=0$) as in the prior art drive signals. When the ambient temperature exceeds the predetermined level, the digit driver 222 and the segment driver 224 generate digit and segment drive signals as shown by the waveforms in FIG. 25B. It will thus be seen that the driver circuit mentioned above can generate first and second drive signals in dependence on the ambient temperature whereby the liquid crystal display device can be appropriately driven to maintain the increased display contrast and reduce the power consumption.

Figure 26:
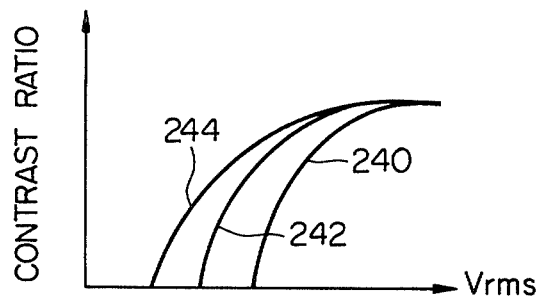
FIG. 26 is a graph illustrating the characteristic of the contrast ratio v.s. the root mean square voltage.

FIG. 26 shows a graph illustrating the relationship between the root-mean-square voltage applied to a liquid crystal and the display contrast. In FIG. 26, the curve 240 indicates the operating characteristic of the liquid crystal at the ambient temperature of 10° C. The curve 242 indicates the operating characteristic of the liquid crystal at the ambient temperature of 20° C. The curve 244 indicates the operating characteristic of the liquid crystal at the ambient temperature of 30° C. It will be seen from these curves that the threshold and saturation voltages of the liquid crystal will decrease as the ambient temperature increases.

Figure 27:
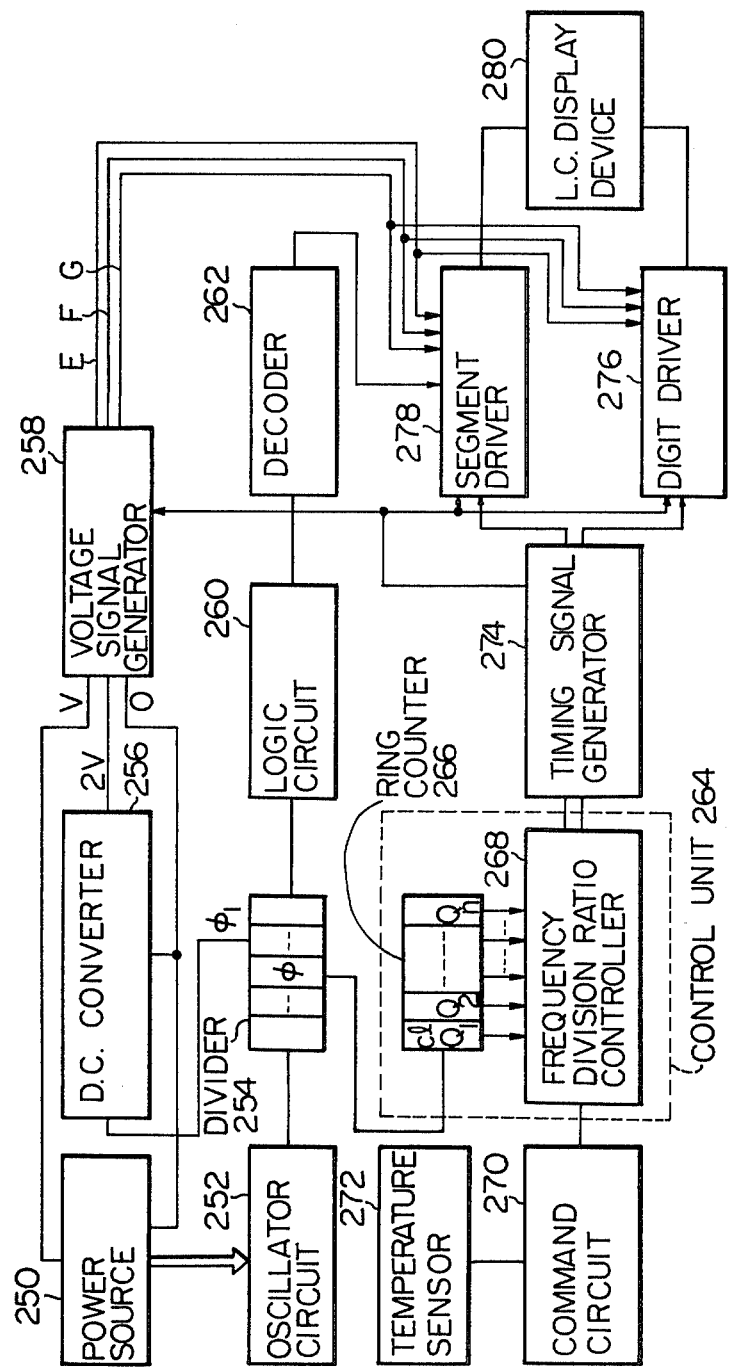
FIG. 27 is a block diagram of third preferred embodiment of a driver circuit according to the present invention.

FIG. 27 shows a block diagram of a third preferred embodiment of a driver circuit according to the present invention adapted to drive a liquid crystal at various root-mean-square voltages in dependence on the variations in ambient temperatures to provide an optimum display contrast. In FIG. 27, a power source 250 is connected to an oscillator circuit 252 which provides a relatively high frequency signal, which is applied to a frequency divider 254. The frequency divider 254 devides down the relatively high frequency signal to provide a clock signals $\phi$ and $\phi_1$ and a relatively low frequency signal. The clock signal $\phi_1$ is applied to a d.c. converter 256 to which the power source 250 is connected. The d.c. converter 256 converts the output voltage of the power source 250 to an output voltage at the potential 2V, which is applied to a voltage signal generator 258 to which the power source 250 is connected. The voltage signal generator 258 may be of the same construction as that of FIG. 12 and generate voltage signals E, F and G. The output of the frequency divider 254 is coupled to a logic circuit 260. The logic circuit 260 may comprise a calculator circuit adapted to perform arithmetic function in response to various output signals from a keyboard (not shown), or a time counter of an electronic timepiece. The logic circuit 260 generates display information signals, which are applied to a decoder 262. The decoder 262 may be of the same construction as that of FIG. 20 and generate binary coded output signals.

The clock signal $\phi$ from the frequency divider 254 is applied to a control unit 264 composed of a count-by-9 ring counter 266 and a frequency division ratio controller 268. The frequency division ratio controller 268 is connected at its input to a command circuit 270, which generates various command signals in response to temperature signals applied from a temperature sensor 272. The frequency division ratio controller 268 applies selected ones of outputs of the ring counter 266 to a timing signal generator 274. The timing signal generator 274 generates various control signals and timing signals in response to the selected outputs of the ring coutner 266. The control signals are applied to the voltage signal generator 258, digit driver 276 and segment driver 278. The timing signals are applied to the digit driver 276 and the segment driver 278, which generate various drive signals at a plurality of predetermined sequences to drive a liquid crystal display device 280 at an optimum mode to increase the display contrast.

Figure 28:
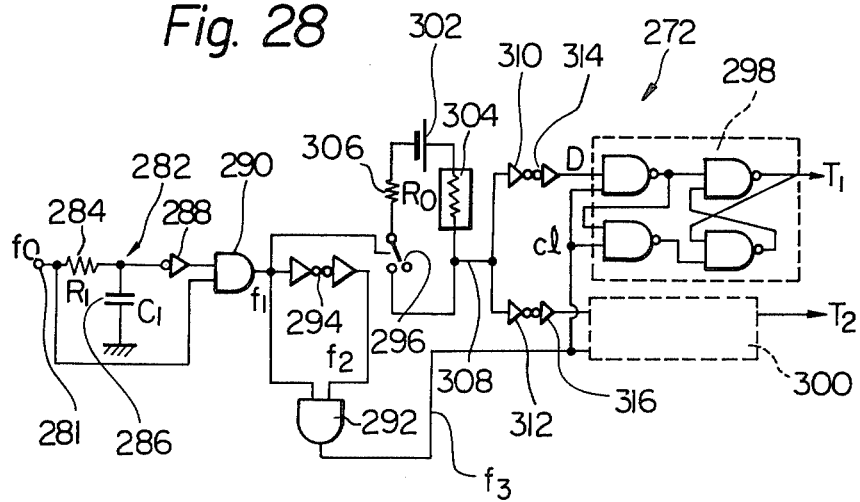
FIG. 28 is a detail circuitry for a temperature sensor forming part of the circuit of FIG. 27.

FIG. 28 shows a detail circuitry for the temperature sensor 272 shown in FIG. 27. As shown, the temperature sensor 272 has an input terminal 281 to receive an input signal $f_o$ of a predetermined frequency, i.e., a frequency equivalent to ten minutes such that an ambient temperature is detected every ten minutes. The input signal $f_o$ is applied to an integrating circuit 282. The input signal may be obtained from a suitable stage of the divider 254 or the logic circuit 260. The integrating circuit 282 comprises a resistor 284 coupled to the input terminal 281, and a capacitor 286 coupled between the resistor 284 and the ground. The integrating circuit 282 integrates the input signal $f_o$ in terms of time to generate an output waveform depending on the integration constant determined by $R_1$ and $C_1$. The output waveform of the integrating circuit 282 is shaped by an inverter 288 and applied to an input of an AND gate 290, to the other input of which the input signal $f_o$ is also applied.

Figure 29:
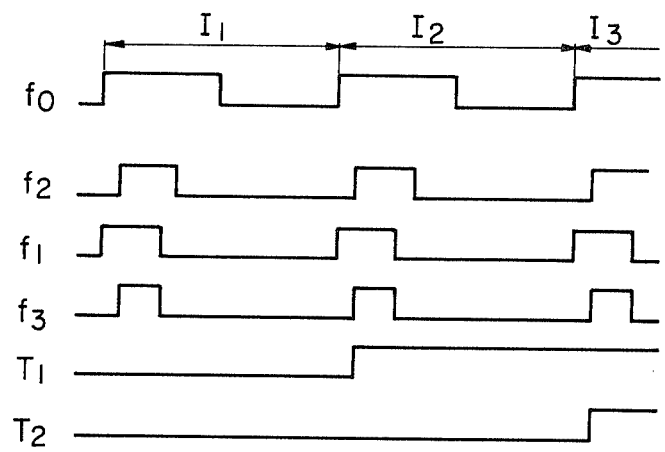
FIG. 29 is a timing chart for illustrating the operation of the circuit of FIG. 28.

Thus, the AND gate 290 generates an output $f_1$ having a duty cycle lower than that of the input signal $f_o$ as shown in FIG. 29 to reduce the power consumption required for temperature detection. The output $f_1$ is applied to one input of an AND gate 292, a delay circuit 294 and an electronic switch 296. The delay circuit 294 is composed of series connected inverters and generates an output $f_2$ as shown in FIG. 29, which is applied to the other input of the AND gate 292 by which an output signal $f_3$ is generated as shown in FIG. 29. The output signal $f_3$ is applied to first and second data-type flip-flops 298 and 300 each composed of four NAND gates.

The electronic switch 296 may comprise a transmission gate composed of MOSFETs which are turned on to apply an output voltage of a battery 302 to a temperature sensing element such as a thermistor 304 when the signal $f_1$ goes to a high level. Indicated as 306 is a resistor labeled $R_o$. The thermistor 304 may comprise a resistive circuit component, having a high negative temperature coefficient of resistance, so that its resistance decreases as the temperature increases. Thus, the thermistor 304 generates various voltage signals in dependence on the variations in the ambient temperature. The voltage signals appearing at lead 308 are applied to first and second voltage detecting means 310 and 312, each of which comprises an inverter made of a complementary pair of MOSFETs. The threshold voltage $V_1$ of the inverter 310 is set to a first value equal to the voltage level $V_o$ of the signal appearing on lead 308 when the ambient temperature reaches 10° C. Similarly, the threshold voltage $V_2$ of the inverter 312 is set to a second value equal to the voltage level $V_o$ of the signal appearing on lead 308 when the ambient temperature reaches 30° C. The outputs of the inverters 310 and 312 are applied through inverters 314 and 316 to data input terminals D of the flip-flops 298 and 300, respectively, whose clock input terminals $C_1$ are applied with the signal $f_3$ from the AND gate 292.

In a case in which the voltage level $V_o$ of the signal appearing on lead 308 is expressed by the relationship $V_0 < V_1 < V_2$ during the time interval $I_1$ in FIG. 29, it is meant that the ambient temperature is below 10° C. In this case, the outputs of the inverters 314 and 316 go to a low level so that outputs $T_1$ and $T_2$ of the flip-flops 298 and 300 have a low level. During the time interval $I_2$, if the ambient temperature reaches 10° C, then the output of the inverter 314 goes to a high level and, therefore, the output $T_1$ goes to a high level as shown in FIG. 29. During the time interval $I_3$, if the ambient temperature reaches 30° C, then the output of the inverter 316 goes to a high level and, therefore, the output $T_2$ goes to a high level as shown in FIG. 29. The outputs $T_1$ and $T_2$ are applied to the command circuit 270.

Figure 30:
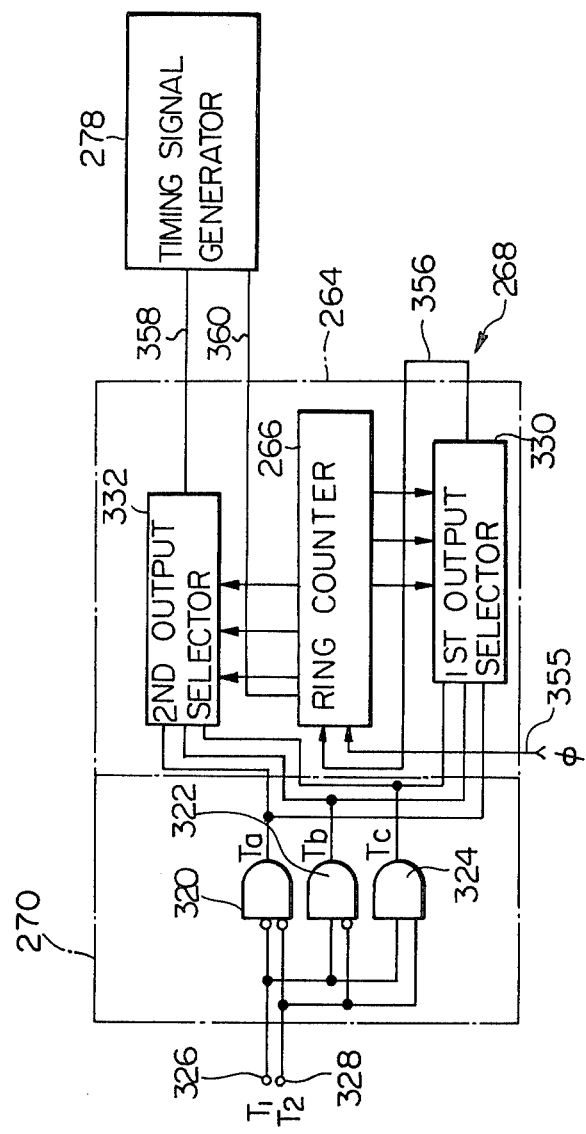
FIG. 30 is a detail circuitry for a command circuit and associated components forming part of the circuit of FIG. 27.

As shown in FIG. 30, the command circuit 270 comprises first, second and third AND gates 320, 322 and 324, each having first and second inputs coupled to input terminals 326 and 328 labeled $T_1$ and $T_2$, respectively. The AND gates 320 to 324 generate temperature signals $T_a$, $T_b$ and $T_c$ in dependence on the signals $T_1$ and $T_2$ supplied from the temperature sensor 272. The relationships between the outputs $T_1$ and $T_2$ and the temperature signals $T_a$, $T_b$ and $T_c$ are expressed as:

$$T_a = \overline{T_1}\overline{T_2}$$

$$T_b = T_1\overline{T_2}$$

$$T_c = T_1 T_2$$

It should be noted that the temperature signal $T_a$ indicates that the ambient temperature is below 10° C. The signal $T_b$ indicates that the ambient temperature is between 10° and 30° C, and the signal $T_c$ indicates that the ambient temperature is above 30° C. These temperature signals $T_a$, $T_b$ and $T_c$ are applied to the frequency division ratio controller 268 of the control unit 264.

As shown in FIGS. 30 and 31, the frequency division ratio controller 268 comprises first and second output selecting circuits 330 and 332. The output selecting circuit 330 serves as a unit for controlling the operating mode of the ring counter 266, while the output selecting circuit 332 serves as a unit for determining the ratio of the pulse widths of the first and second pulse components constituting drive signals for a liquid crystal, i.e., t/T. The first and second output selecting circuits 330 and 332 have common control input terminals 334, 336 and 338 labeled $T_a$, $T_b$ and $T_c$, respectively. The first output selecting circuit 330 is composed of switching means such as transmission gates TG30, TG31 and TG32 having their control gates coupled to the control input terminals 334, 336 and 338, respectively. The transmission gates TG30, TG31 and TG32 have inputs coupled to input terminals 340, 342 and 344 labeled $Q_9$, $Q_7$ and $Q_5$, respectively, and outputs coupled together and connected to an output terminal 346. Likewise, the second output selecting circuit 332 is composed of switching means such as transmission gates TG33, TG34 and TG35 having their control gates coupled to the common control input terminals 334, 336 and 338, respectively. The transmission gates TG33, TG34 and TG35 have inputs coupled to input terminals 348, 350 and 352 labeled $Q_5$, $Q_4$ and $Q_3$, respectively, and outputs coupled together and connected to an output terminal 354. The symbols $Q_3$, $Q_4$, $Q_5$, $Q_7$ and $Q_9$ represent outputs of the ring counter 266 constituted by flip-flops $Q_1$ to $Q_9$ as shown in FIG. 32. The clock signal $\phi$ from the divider 254 is applied through lead 355 to a clock input terminal of the ring counter 266.

Figure 33:
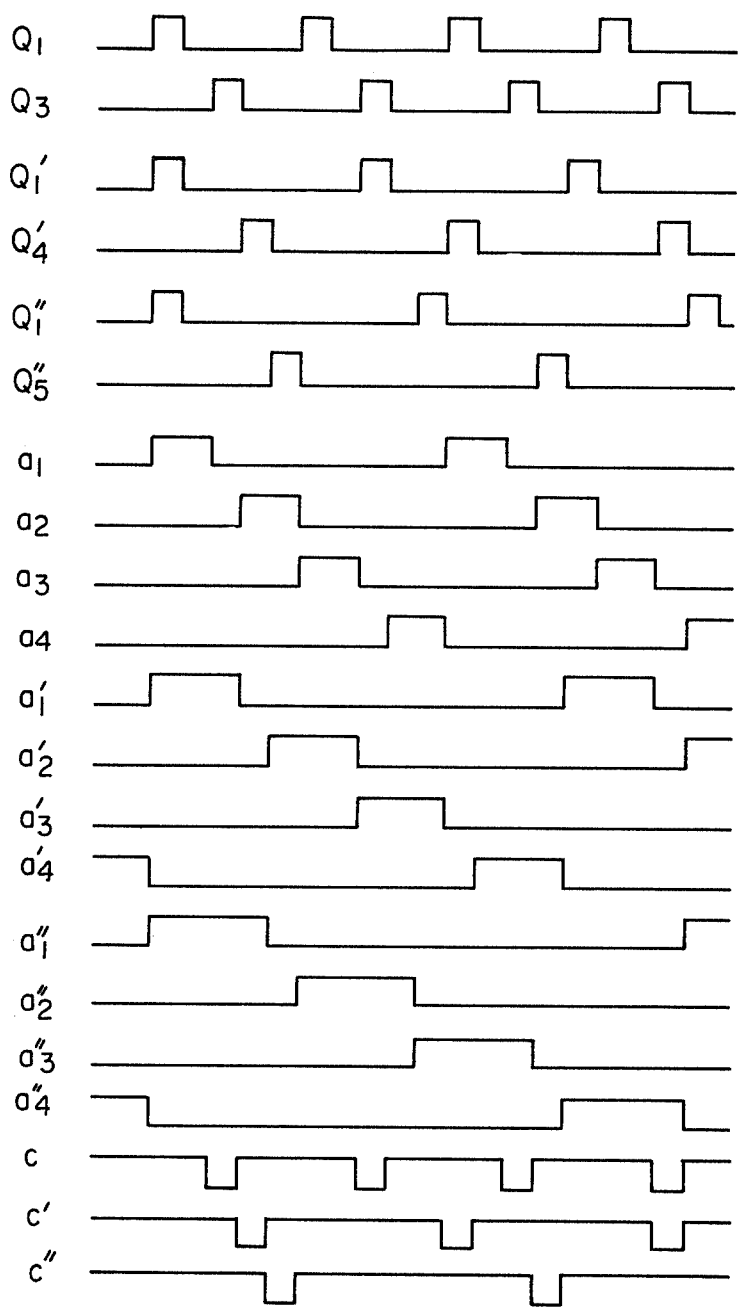
FIG. 33 is a waveform diagram illustrating the operation of the circuit of FIG. 27.

When the temperature signal $T_a$ goes to a high level, the transmission gate TG30 is turned on, and the signal $Q_9$ is passed to the output terminal 346, from which the signal $Q_9$ is applied through lead 356 to the input terminal of the flip-flop $Q_1$ of the ring counter 266. Consequently, the ring counter 266 serves as a count-by-9 counter. At the same time, the transmission gate TG33 is turned on, and the signal $Q_5$ is passed to the output terminal 354, from which the signal $Q_5$ is applied as an input $Q''_5$ through lead 358 to the timing signal generator 274 to which the signal $Q_1$ from the ring counter 266 is also applied as an input $Q''_1$ through lead 360. The waveforms for the inputs $Q''_1$ and $Q''_5$ are shown in FIG. 33.

Similarly, when the temperature signal $T_b$ goes to a high level, the transmission gates TG31 and TG34 are turned on to pass the signals $Q_7$ and $Q_4$ to the output terminals 346 and 354, respectively. In this case, the ring counter 266 serves as a count-by-7 counter, whose $Q_1$ output is applied as an input $Q'_1$ through lead 360 to the timing signal generator 274 and the $Q_4$ output is applied as an input $Q'_4$ to the timing signal generator 274. The waveforms for the inputs $Q'_1$ and $Q'_4$ are shown in FIG. 33. Likewise, when the temperature signal $T_c$ goes to a high level, the ring counter 266 serves as a count-by-5 counter whose $Q_1$ output is applied as an input $Q_1$ through lead 360 to the timing signal generator 274 to which the $Q_3$ output is applied as an input $Q_3$ as shown in FIG. 33.

It will thus be seen that the frequency of the signal appearing on lead 360 is varied in dependence on the variations in the ambient temperature and the output stage of the ring counter 266 is selected in dependence on the temperature variations to appropriately determine the value of the frequency of the second pulse component with respect to the frequency of the first pulse component of the drive signal applied to the liquid crystal display device.

The timing signal generator 274 may be arranged in a manner similar to that shown in FIG. 14 and, in this case, the lead 360 is connected to the set terminal of the flip-flop 76 while the lead 358 is connected to the reset terminal of the flip-flop 76. In addition, the lead 358 may be connected to the inverter 80 to generate a control signal C as shown in FIG. 15A, and the AND gates 84 and 88.

Thus, when the temperature signal $T_a$ goes to a high level, the timing signal generator 274 generates a control signal $C''$ which is the inverse of the input signal $Q''_5$, and a plurality of timing signals $a''_1$ to $a''_4$. When the temperature signal $T_b$ goes to a high level, the timing signal generator 274 generates a control signal $C'$ which is the inverse of the input signal $Q'_4$, and a plurality of timing signals $a'_1$ to $a'_4$. When the temperature signal $T_c$ goes to a high level, the timing signal generator 274 generates a control signal C which is the inverse of the input signal $Q_3$, and a plurality of timing signals $a_1$ to $a_4$. The waveforms for the control signals and the timing signals are shown in FIG. 33.

Turning now to FIG. 27, the control signals from the timing signal generator 274 are applied to the voltage signal generator 258 which generates the voltage signals E, F and G synchronism with the control signals in a manner as previously described with reference to FIGS. 12 and 13. These control signals and the timing signals are applied to the digit drive 276 and the segment driver 278. The digit driver 276 may have the same construction as that shown in FIG. 16.

When the ambient temperature is above 30° C, the timing signals $a_1$ to $a_4$ are applied to the digit driver 278, by which digit signals $D_1$ and $D_2$ are generated as shown in FIG. 34. In this case, the ratio t/T is expressed as ½.

When the ambient temperature is between 10° and 30° C, the digit driver 278 generates digit drive signals $D'_1$ and $D'_2$ as shown in FIG. 34 in response to the timing signals $a'_1$ to $a'_4$ and the control signal $C'$. In this case, the ratio t/T is expressed ⅓.

When the ambient temperature is below 10° C, the digit drive 278 generates digit drive signals $D''_1$ and $D''_2$ as shown in FIG. 34 in response to the timing signals $a''_1$ to $a''_4$ and the control signal $C''$. In this case, the ratio t/T is expressed as ¼.

It will now be seen that the duty of the digit drive signals is varied in dependence on the temperature variations whereby the root-mean-square voltage applied to the liquid crystal display device 280 can be appropriately varied. While the segment drive signals generated by the segment drive 276 are not shown in the drawings, it should be noted that the segment driver 276 generates segment drive signals in a manner as previously described. It should further be noted that thermistor 304 of the temperature sensor 272 may be replaced with a voltage detector to detect the level of an output voltage of a power source for thereby changing the root-mean-square voltages applied to the liquid crystal when the power source output decreases below a predetermined level.

Figure 35:
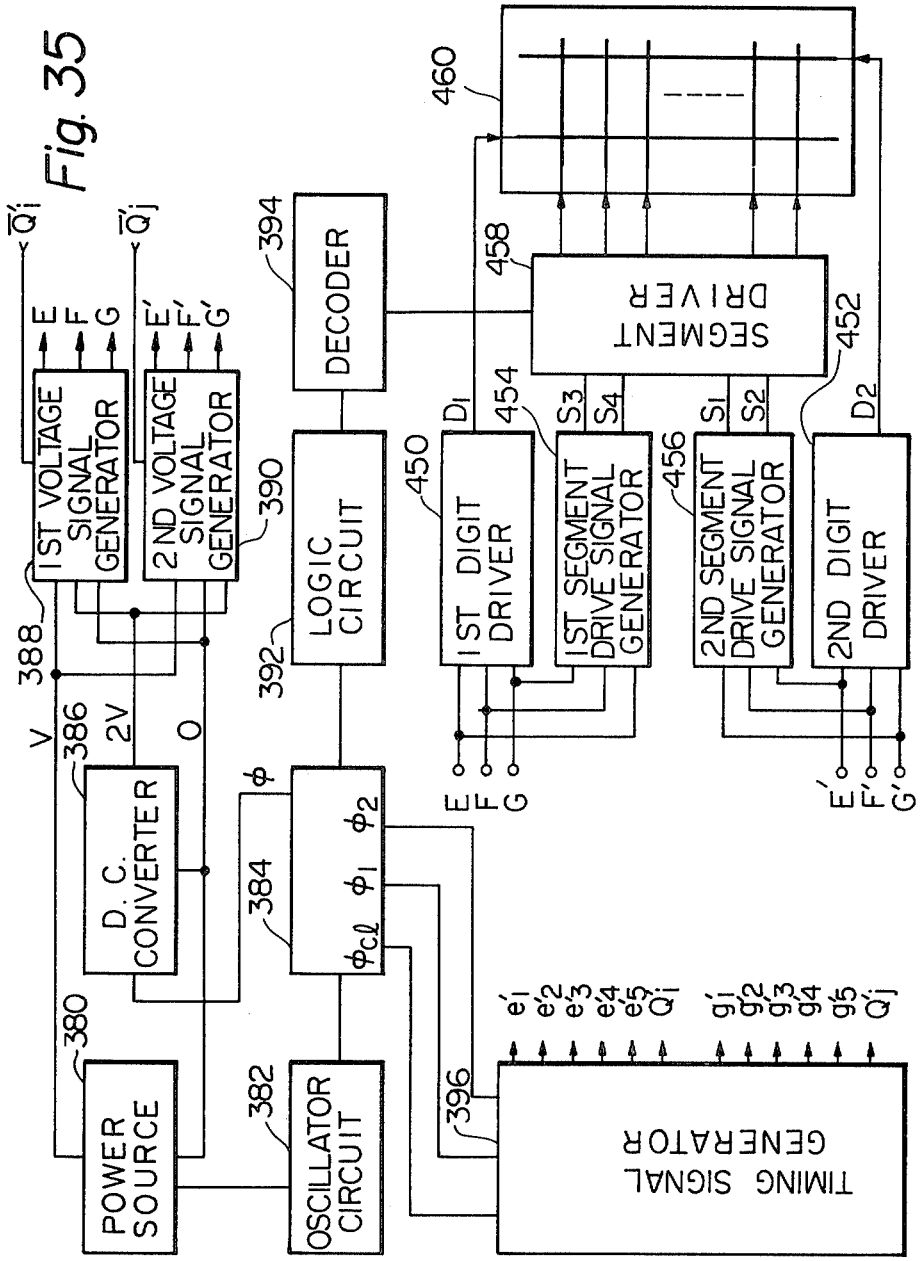
FIG. 35 is a block diagram of a fourth preferred embodiment of a driver circuit according to the present invention.

FIG. 35 shows a block diagram of a fourth preferred embodiment of a driver circuit according to the present invention adapted to minimize the power consumption required in a matrix driving. In FIG. 35, the driver circuit comprises a power source 380, which supplies power to an oscillator circuit 382 adapted to provide a relatively high frequency signal. This high frequency signal is applied to a frequency divider 384, which divides down the high frequency signal to provide a relatively low frequency signal and clock signals $\phi_{cl}, \phi_1, \phi_2$ and $\phi$. The clock signals $\phi_1$ and $\phi_2$ are in synchronism with the rising edge of the clock signal $\phi_{cl}$. The clock signal $\phi$ is applied to a d.c. converter 386, which converts an output voltage of the power source 380 in response to the clock signal $\phi$ from the frequency divider 384 to provide an output voltage at the potential 2V. The output voltages from the power source 380 and the d.c. converter 386 are applied to first and second voltage signal generators 388 and 390. The first voltage signal generator 388 generates voltage signals E, F and G in synchronism with a control signal $Q_i$ which will be described later. Likewise, the second voltage signal generator 390 generates voltage signals E', F' and G' in synchronism with a control signal $Q'_j$ which will also be described later. The low frequency signal from the frequency divider 384 is applied to a logic circuit 392 arranged to generate display information signals, which are applied to a decoder 394. The decoder 394 converts the display information signals to provide binary coded output signals. The clock signals $\phi_{cl}, \phi_1$ and $\phi_2$ are applied to a timing signal generator 396, which generates a first group of timing signals $e'_1, e'_2, e'_3, e'_4$ and $e'_5$ and a first control signal $Q'_i$, and a second group of timing signals $g'_1, g'_2, g'_3, g'_4$ and $g'_5$ and a second control signal $Q'_j$.

Figure 36:
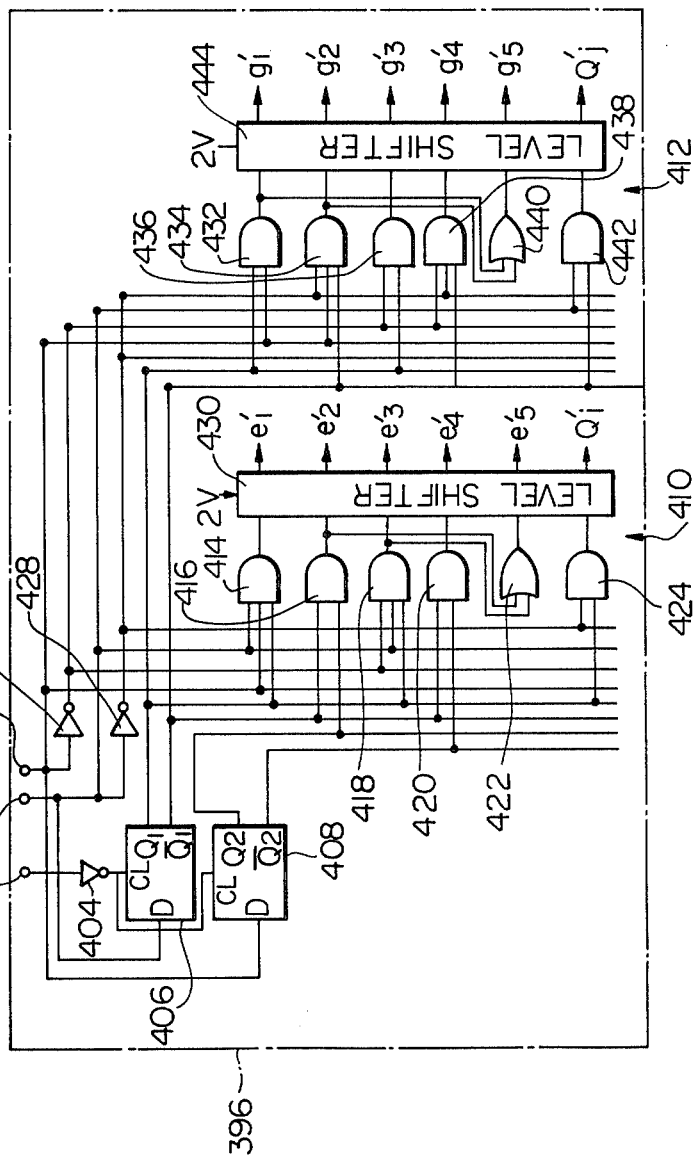
FIG. 36 is a detail circuitry for a timing signal generator forming part of the circuit of FIG. 35.
Figure 37:
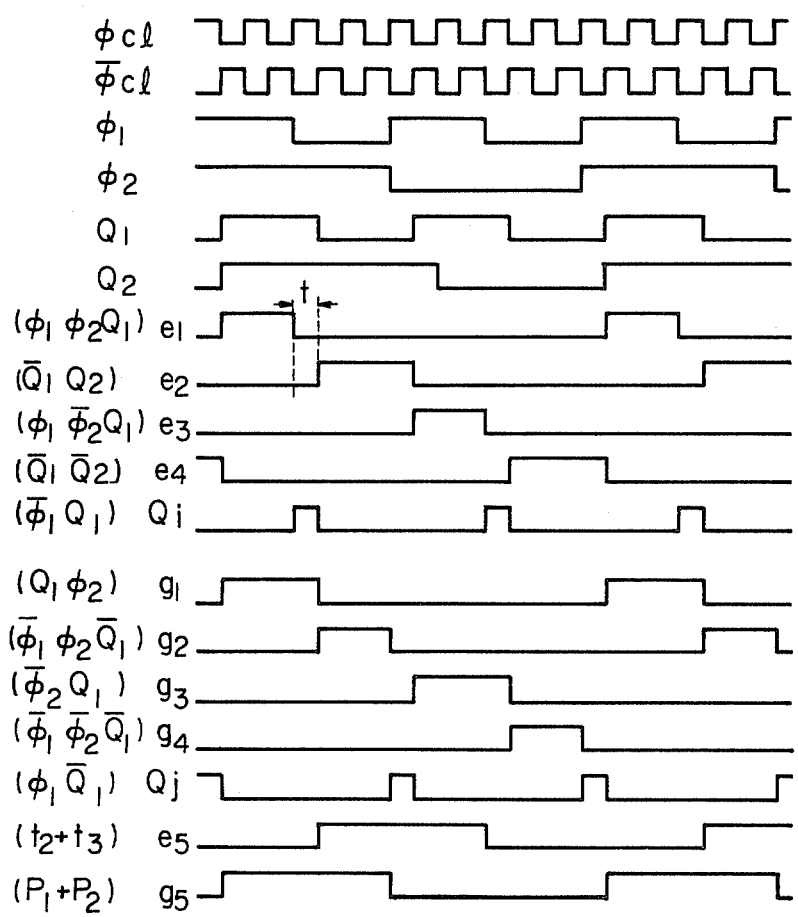
FIG. 37 is a timing chart for the waveforms obtained by the circuit of FIG. 36.

FIG. 36 shows a detail circuitry for the timing signal generator 396 shown in FIG. 35. As shown, the timing signal generator 396 has input terminals 398, 400 and 402 coupled to the intermediate stages of the frequency divider 384 to receive the clock signals $\phi_{cl}, \phi_1$ and $\phi_2$ therefrom. The clock signal $\phi_{cl}$ is used for determining the pulse width t of a pulse component contained in digit and segment drive signals, and the clock signal $\phi_1$ is used for determining a frame time or one cycle period of the drive signals. The clock signal $\phi_{cl}$ appearing at the input terminal 398 is applied through an inverter 404 to clock input terminals of first and second latch circuits 406 and 408. The first latch circuit 406 has its data input terminal coupled to the input terminal 400 to receive the clock signal $\phi_1$ to generate an output $Q_1$ as shown in FIG. 37. The second latch circuit 408 has its data input terminal coupled to the input terminal 402 to receive the clock signal $\phi_2$ to generate an output $Q_2$ as shown in FIG. 37.

As shown, the timing signal generator 396 comprises first and second circuit sections 410 and 412. The first circuit section 410 comprises AND gates 414, 416, 418, 420 and 424, and an OR gate 422. The AND gate 414 has a first input connected to the input terminal 400, a second input connected to the input terminal 402, and a third input connected to the $Q_1$ output of the first latch circuit 406. Thus, the AND gate 414 generates an output $e_1$ which is the product of $\phi_1, \phi_2$ and $Q_1$, as shown in FIG. 37. The AND gate 416 has a first input connected to the $\overline{Q}_1$ output of the first latch circuit 406, and a second input connected to the $Q_2$ output of the second latch circuit 408, to generate an output $e_2$ which is the product of $\overline{Q}_1$ and $Q_2$. The AND gate 418 has a first input coupled to an output of an inverter 426, a second input coupled to the input terminal 400, and a third input coupled to the $Q_1$ output of the first latch circuit 406, to generate an output $e_3$ which is the product of $\phi_1$, $\overline{\phi}_2$ and $Q_1$. The AND gate 420 has a first input coupled to the $\overline{Q}_1$ output of the first latch circuit 406, and a second input coupled to the $\overline{Q}_2$ output of the second latch circuit 408, to generate an output $e_4$, which is the product of $\overline{Q}_1$ and $\overline{Q}_2$. The OR gate 422 generates a timing signal $e_5$ which is the sum of $e_2$ and $e_3$. The AND gate 424 has a first input coupled to an output of an inverter 428, and a second input coupled to the $Q_1$ output of the first latch circuit 406 to generate an output $Q_i$ which is the product of $\overline{\phi}_1$ and $Q_1$. The outputs $e_1$ to $e_5$ and $Q_i$ vary between the potentials O and V as shown in FIG. 37. These outputs are applied to a level shifter 430, which produces a first group of timing signals $e'_1$ to $e'_5$ and a first control signal $Q'_i$ which vary between the potentials O and 2V. These signals are identical to outputs $e_1$ to $e_5$ and $Q_i$ except that the pulse amplitudes are different from each other and, therefore, they are not shown in the drawings for the sake of simplicity of illustration.

Similarly, the second circuit section 412 comprises AND gates 432, 434, 436, 438 and 442, and an OR gate 440. The AND gate 432 generates an output $g_1$ which is the product of $Q_1$ and $\phi_2$. The AND gate 434 generates an output $g_2$ which is the product of $\overline{\phi}_1$, $\phi_2$ and $\overline{Q}_1$. The AND gate 436 generates an output $g_3$ which is the product of $\overline{\phi}_2$ and $Q_1$. The AND gate 438 generates an output $g_4$ which is the product of $\overline{\phi}_1$, $\overline{\phi}_2$ and $\overline{Q}_1$. The OR gate 440 generates an output $g_5$ which is the sum of $g_1$ and $g_2$. The AND gate 442 generates an output $Q_j$ which is the product of $\phi_1$ and $\overline{Q}_1$. These outputs have the waveforms shown in FIG. 37, and are applied to a level shifter 444 which generates a second group of timing signals $g'_1$ to $g'_5$ and a second control signal $Q'_j$ varying between the potentials O and 2V.

Figure 38:
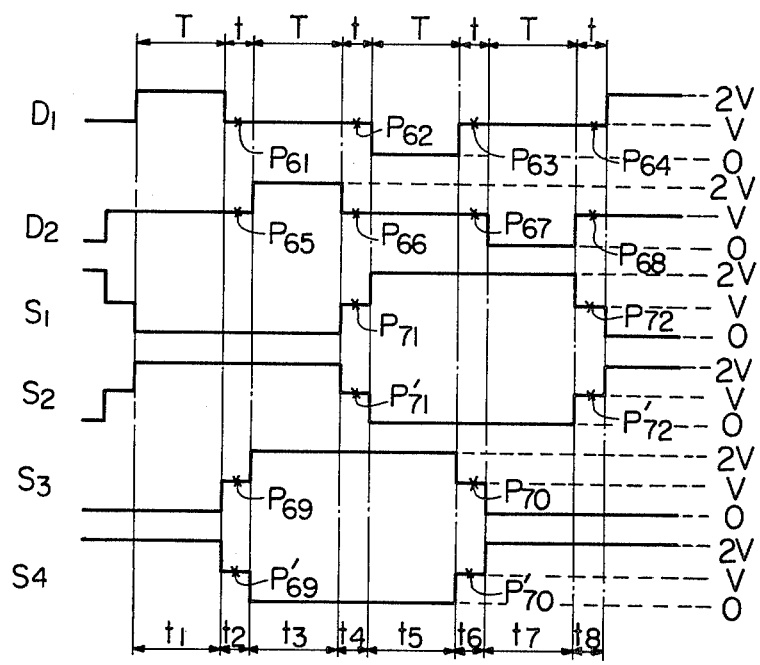
FIG. 38 is a waveform diagram illustrating digit and segment drive signals obtained by the circuit of FIG. 35.

Turning now to FIG. 35, the first group of timing signals $e'_1$ to $e'_4$ and the first control signal $\overline{Q'_i}$ are applied to a first digit driver 450, to which the voltage signals E, F and G are also applied from the first voltage signal generator 388. The first digit driver 450 generates a first digit drive signal $D_1$ having the waveform shown in FIG. 38. The second group of timing signals $g'_1$ to $g'_4$ and the second control signal $\overline{Q'_j}$ are applied to a second digit driver 452, to which the voltage signals E', F' and G' from the second voltage signal generator 390 are also applied. The second digit driver 452 generates a second digit drive signal $D_2$ having the waveform as shown in FIG. 38. Similarly, the first timing signals $e'_5$ and $\overline{e'_5}$ and the first control signal $\overline{Q'_i}$ are applied to a first segment drive signal generator 454, to which the voltage signals E, F and G are also applied. Thus, the first segment drive signal generator 454 generates segment drive signals $S_3$ and $S_4$ having the waveforms as shown in FIG. 38. Likewise, the second timing signals $g'_5$ and $\overline{g'_5}$ and the second control signal $\overline{Q'_j}$ are applied to a second segment drive signal generator 456, to which the voltage signals E', F' and G' are also applied. The second segment drive signal generator 456 generates segment drive signals $S_1$ and $S_2$ having the waveforms as shown in FIG. 38. The first and second digit drive signals $D_1$ and $D_2$ are applied to first and second digit electrodes of a liquid crystal display device 460. On the other hand, a selected one of the segment drive signals $S_1$ to $S_4$ is applied to each of the segment electrodes of the display device 460 by a segment driver 458 in response to decoder's outputs.

As best shown in FIG. 38, the digit drive signals $D_1$ and $D_2$ have four pulse components of a pulse width t and having the potential V during each frame time or one cycle period, whereas the segment drive signals $S_1$ to $S_4$ have two pulse components of the pulse width t and having the potential V during each frame time. The pulse components $P_{61}$ to $P_{64}$ of the first digit drive signal $D_1$ and the pulse components $P_{65}$ to $P_{68}$ of the second digit drive signal $D_2$ are in synchronism with each other, and have the same potential V. The pulse components $P_{69}$ and $P_{70}$ of the segment drive signal $S_3$ and the pulse components $P'_{69}$ and $P'_{70}$ of the segment drive signal $S_4$ have the same potential V in synchronism with each other. On the other hand, the pulse components $P_{71}$ and $P_{72}$ of the segment drive signal $S_1$ and the pulse components $P'_{71}$ and $P'_{72}$ of the segment drive signal $S_2$ have the same potential V in synchronism with each other. In addition, the pulse components $P_{69}$ and $P'_{69}$ of the segment drive signals $S_3$ and $S_4$ are in synchronism with the pulse components $P_{61}$ and $P_{65}$ of the digit drive signals $D_1$ and $D_2$ at a first timing, i.e., during the time interval $t_2$. During this time interval, the segment drive signal $S_1$ has the potential O, and the segment drive signal $S_2$ has the potential 2V. The pulse components $P_{71}$ and $P'_{71}$ of the segment drive signals $S_1$ and $S_2$ are in synchronism with the pulse components $P_{62}$ and $P_{66}$ of the digit drive signals $D_1$ and $D_2$ at a second timing, i.e., during the time interval $t_4$. During this time interval, the segment drive signal $S_3$ has the potential 2V, and the segment drive signal $S_4$ has the potential O. In this manner, the segment drive signals $S_3$ and $S_4$ have the same potential as those of the digit drive signals $D_1$ and $D_2$ during the time intervals $t_2$ and $t_6$ in each cycle period at which the segment drive signals $S_1$ and $S_2$ have the potentials other than V. Likewise, the segment drive signals $S_1$ and $S_2$ have the same potential as those of the digit drive signals $D_1$ and $D_2$ during the time intervals $t_4$ and $t_8$ in each cycle period at which the segment drive signals $S_3$ and $S_4$ have the potentials other than V.

Figure 39:
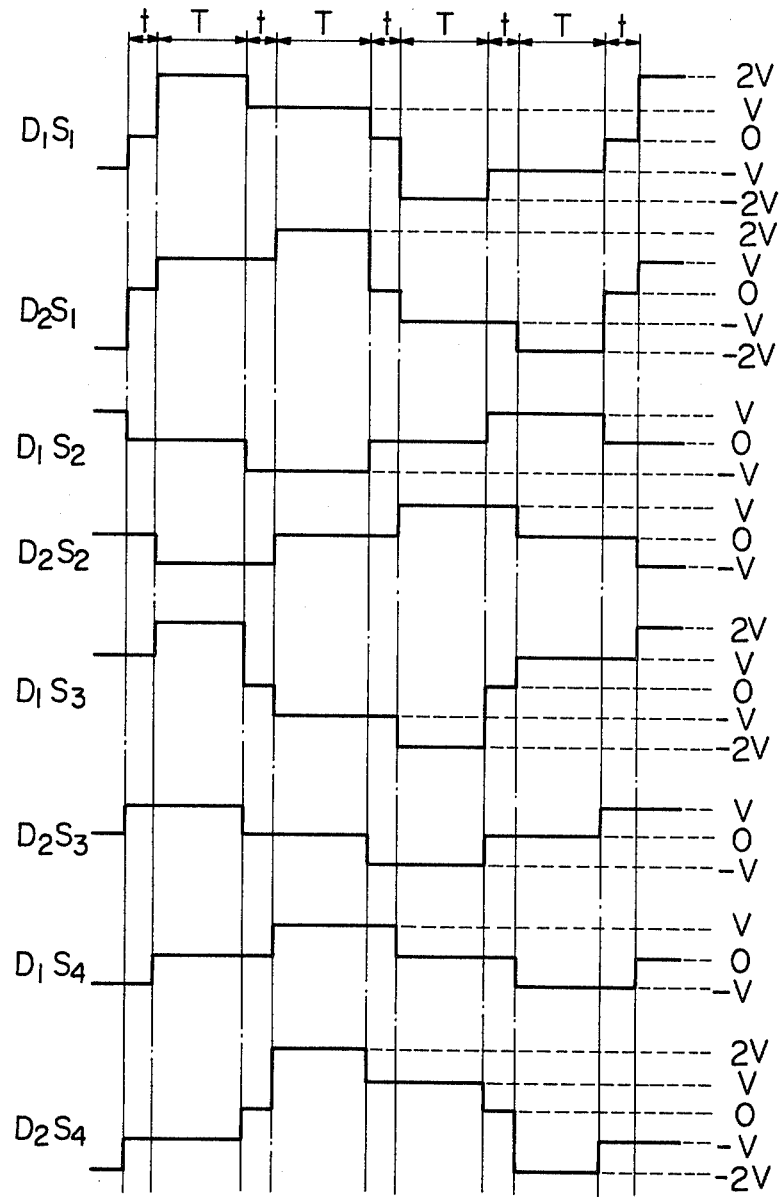
FIG. 39 is a timing chart illustrating the potential difference across the electrodes of a liquid crystal display device shown in FIG. 35.

FIG. 39 shows an example of the waveform diagrams illustrating the potential difference across the digit electrodes and the segment electrodes. In FIG. 39, the waveforms $D_1S_1$ and $D_2S_1$ indicate the potential difference across the electrodes when the segment drive signal $S_1$ is applied to the segment electrode. The waveforms $D_1S_2$ and $D_2S_2$ indicate the potential difference across the electrodes when the segment drive signal $S_2$ is applied to the segment electrode. The waveforms $D_1S_3$ and $D_2S_3$ indicate the potential difference across the electrodes when the segment drive signal $S_3$ is applied to the segment electrode. The waveforms $D_1S_4$ and $D_2S_4$ indicate the potential difference across the electrodes when the segment drive signal $S_4$ is applied to the segment electrode.

Various advantages obtained by the drive signals of FIG. 38 will be described below with reference to FIGS. 40A, 40B, 40C, 40D and 40E. In FIG. 40A, there is schematically shown the connection between the electrodes D and S of a liquid crystal 500 and a power source 501. A block 502 indicates terminals A, B and C, and a block 504 indicates terminals E, F and G. Terminals A and E are connected to the potential 2V, B and F connected to the potential V, and C and G connected to the potential O. When the digit electrode D is connected to the terminal A and the segment electrode is connected to the terminal G, the potential difference across the electrodes is 2V. In this manner, the potential difference across the electrodes has values different from each other in dependence on the connections between the electrodes and the terminals. FIG. 40B shows the various combinations of voltages O, V and 2V applied to the digit electrode D and the segment electrode S. For example, a block 506 indicates a condition in which the digit electrode D is connected to the terminal B at the potential V and the segment electrode S is connected to the terminal E at the potential 2V so that the potential difference across the electrodes is V. Similarly, a block 508 indicates a condition in which the digit electrode D is connected to the potential 2V and the segment electrode S is connected to the potential O so that the potential difference across the electrodes is 2V.

Let us consider that a liquid crystal is a capacitor having a capacitance C. If the capacitor stores a voltage V, then the stored charge Q is expressed as:

$$Q = CV$$

In order to apply an additional charge dQ to the stored charge Q, VdQ of work should be done with respect to the power source and the amount du of work is expressed as:

$$du = VdQ = \frac{Q}{C} dQ$$

Therefore, $$U = \int_0^Q VdQ = \frac{Q^2}{2C}$$

The above equation shows an energy transfer which takes place in a charging process of the capacitor.

In FIG. 40C which shows a charge transfer in a conventional driving method, an electric current equivalent to 6QV of work flows from the power source during each of the processes $b' \rightarrow c'$ and $d' \rightarrow a'$. During each of the processes $a' \rightarrow b'$ and $c' \rightarrow d'$, an electric current equivalent to QV of work flows into the power source. Thus, it will be seen that 10QV of work is done with respect to the power source during one cycle of the processes $a' \rightarrow b' \rightarrow c' \rightarrow d' \rightarrow a'$.

In a driving method achieved by the driver circuit shown in FIG. 35, 4QV of work is done with respect to the power source during each of the processes $c \rightarrow d$ and $f \rightarrow a$ in FIG. 40D. During the processes $b \rightarrow c$ and $e \rightarrow f$, the work done is zero. It will accordingly be seen that 6QV of work is done by the power source during a complete cycle of $a \rightarrow b \rightarrow c \rightarrow d \rightarrow e \rightarrow f \rightarrow a$. Thus, the energy consumption in each cycle is remarkably saved by 40% as composed to the prior art driving method. Experimental results for the power consumption are plotted in FIG. 41. The capacitance of the liquid crystal used was 1000PF. The driving voltages were applied to the liquid crystal at the potentials V = 2 volts and 2V = 4 volts. The power consumption was measured with T = 7.8 milliseconds while varying the value of the pulse width $t$ of the pulse components contained in the drive signals. While the power consumption can be saved by 40% when $$\frac{t}{T} \approx \frac{1}{100}$$

and, thereafter, when the value of t/T increases, the reduction ratio of the power consumption will be constant. It should be noted in this instance that the power consumption of the liquid crystal can be significantly reduced even when the time interval t has a very small value.

A description will now be given to the root-mean-square voltages $V_{on}$ and $V_{off}$ obtained by the waveforms shown in FIGS. 6, 9 and 10. In a case where the liquid crystal display matrix is applied with the digit and segment drive signals as shown in FIG. 6, the root-mean-square voltage $V_{on}$ for the selected segment is expressed as:

$$V_{on} = \sqrt{\frac{5T}{2T+t}} \times V$$

The root-mean-square voltage $V_{off}$ for the nonselected segment is expressed as:

$$V_{off} = \sqrt{\frac{T}{2T+t}} \times V$$

The operating margin k is written as $k = \sqrt{5}$, whose value is equal to the operating margin attained in the conventional driving method in which $t = 0$. The root-mean-square voltages $V_{on}$ and $V_{off}$ will vary in dependence on the value of t/T as indicated in the following Table III.

Table III

| t/T | 0 | 1/5 | 1/2 | 1 | 3/2 | 2 |
|---|---|---|---|---|---|---|
| $V_{on}$ | 2.37 | 2.26 | 2.12 | 1.94 | 1.79 | 1.68 |
| $V_{off}$ | 1.06 | 1.01 | 0.95 | 0.87 | 0.80 | 0.75 |

In the above Table III, a symbol t indicates a pulse width of a second pulse component included in each drive signal, and T represents a pulse width of a first pulse component included in each drive signal. In a case where the optical threshold voltage $V_{TH}$ of a particular liquid crystal display matrix is 0.9 Vrms while the optical saturation voltage $V_S$ thereof is 1.8 Vrms and a power source voltages V and 2V are 1.5 and 3.0 volts, respectively, the liquid crystal display matrix is driven in a range 13 in FIG. 1 with a resultant decrease in the contrast ratio. In this case, if the value of t/T is selected to be t/T = 1 as shown in the above Table III, the liquid crystal display matrix is driven in a range 11 in FIG. 1 without causing a crosstalk effect so that an increased contrast ratio is obtained.

The root-mean-square voltages $V_{on}$ and $V_{off}$ attained by the drive signals shown in FIG. 9 are expressed as:

$$V_{on} = \sqrt{\frac{5T}{2(T+t)}} \times V$$

$$V_{off} = \sqrt{\frac{T}{2(T+t)}} \times V$$

In the above case, the operating margin k is expressed by $k = \sqrt{5}$.

The root-mean-square voltages $V_{on}$ and $V_{off}$ attained by the drive signals shown in FIG. 10 are expressed as:

$$V_{on} = \sqrt{\frac{11T}{3T + 2t}} \times V$$

$$V_{off} = \sqrt{\frac{3T}{3T + 2t}} \times V$$

The operating margin k is written by $k = \sqrt{11/3}$.

It will now be understood that while, in the conventional driving method, using the drive signals shown in FIG. 2, a pulse width W of each pulse component of the drive signals is expressed by $W = L/n$, i.e., $L = n \times W$ where L is a half cycle period and n is the number of digit electrodes and the duty of the digit drive signal is $1/n$, the duty of the digit drive signal used for the present driving method is selected to be small in value than $1/n$ by providing a second pulse component in the digit drive signal. In this case, if the digit drive signal is provided with m number of second pulse components during a half cycle period L, then the half cycle period is expressed by $L = T/(n) + m \cdot t$ where T is a pulse width of a first pulse component and t is a pulse width of a second pulse component.

It will now be appreciated that the second pulse component of the drive signals shown in FIG. 38 has a purpose different from that of the second pulse component of the drive signals shown in FIG. 6, 9 and 10. In the waveform diagrams of FIGS. 6, 9 and 10, the second pulse components are provided in the drive signals with a view to obtaining an optimum display contrast ratio while maintaining the operating margin at a constant value. In the waveform diagram of FIG. 38, however, the second pulse components are provided in the drive signals with a view to minimizing the power consumption of a liquid crystal display matrix. The root-mean-square voltages $V_{on}$ and $V_{off}$ attained by the waveforms shown in FIG. 38 will be written as:

$$V_{on} = \sqrt{\frac{5T + t}{2(T + t)}} \times V$$

$$V_{off} = \sqrt{\frac{T + t}{2(T + t)}} \times V = \sqrt{\frac{1}{2}} \times V$$

where T = a pulse width of the first pulse components
t = a pulse width of the second pulse components
V = applied voltage Therefore, the operating margin k is expressed as:

$$k = \sqrt{\frac{5T + t}{T + t}}$$

This operating margin varies in dependence on the value of t/T. Consequently, when t/T = 1/100, $k \doteq 2.23$ and when t/T = 1/10, $k \doteq 2.15$. As previously noted, since the power consumption can be remarkably reduced even when t/T ÷ 1/100, the contrast ratio of the display matrix is not adversely affected even in a case where t/T = 1/100.

The power consumption of a liquid crystal display matrix will decrease with a decrease in a work done with respect to a power source during each cycle period or frame time when the state of an electrical charge stored across digit and segment electrodes of the display matrix varies to another state. In accordance with the present invention, it is proposed to provide a time interval in which a discharge will take place not through the power source in at least one portion of charge transfer processes during each cycle period, i.e., in the processes b→c and e→f as shown in FIG. 40D. These processes are similar to those in which the voltage potential across the electrodes becomes zero when the liquid crystal display matrix is applied with drive signals as shown in FIGS. 6, 9 and 10. In order to save the power consumption required for driving the liquid crystal display matrix, it is required that the voltage potentials of the drive signals applied to the digit and segment electrodes vary at a level as small as possible. While, in the waveform diagram of FIG. 38, the digit and segment drive signals have second pulse components of the same potential at a selected timing such that the root-mean-square voltages $V_{on}$ and $V_{off}$ of each display element are equal to each other, it should be noted that, in a case where a particular display element is used for the display of information more times than the other display element, the drive signals may be modified to reduce the power consumption of the particular display element at a larger degree. This is achieved by applying to the digit and segment electrodes with such drive signals as to cause a charge transfer not in a step E→A but in steps E→D→A or E→B→A in FIG. 40E. In this case, a work done with respect to the power source is 3QV in each step. In this case, although the root-mean-square voltages $V_{on}$ and $V_{off}$ of each display element will be different in level at each state, the contrast ratio will vary in a negligible degree since of pulsewidth t of the second pulse component of the drive signals can be set to have a significantly small time interval as previously noted above. The above proposals are advantageous especially for a one-by-third bias driving method using three of four different voltage sources.

FIG. 42 shows a waveform diagram for drive signals using four voltage sources for driving a liquid crystal display matrix whose number of digit electrodes is two, i.e., $n = 2$. In FIG. 42, symbols D and S represent digit and segment drive signals attained by the present invention, and D-S indicates the potential difference across the electrodes. Symbols D' and S' represent digit and segment drive signals used in a conventional one-cy-third bias driving method, and D'-S' indicates the potential difference across the electrodes when the liquid crystal display matrix is applied with the digit and segment drive signals D' and S'. In the conventional driving method, the digit drive signal D' is composed of pulse components $P_{80}$ to $P_{83}$ of the same pulse width T'. Similarly, the segment drive signal S' is composed of pulse components $P_{84}$ to $P_{87}$ of the same pulse width T'. Thus, the potential difference across the electrodes varies at the potentials 3V, −V, −3V and V during each cycle period as shown by the waveform D'-S' in FIG. 42.

In accordance with the present invention, the digit drive signal D is composed of first pulse components $P_{90}$ to $P_{93}$ of a first pulse width T, second pulse components $P_{94}$ and $P_{95}$ of a second pulse width t, and third pulse components $P_{96}$ to $P_{99}$ of a third pulse width t'. As shown, in FIG. 42, the digit drive signal D has at least one third pulse component $P_{96}$ between the first and second pulse components $P_{90}$ and $P_{94}$ during each half cycle period, which third pulse component has an intermediate potential between the potentials of the first and second pulse components. The third pulse component $P_{97}$ is provided between the pulse components $P_{91}$ and $P_{92}$ and has an intermediate potential between those of the pulse components $P_{91}$ and $P_{92}$. Similarly, the segment drive signal S is composed of first pulse components $P'_{90}$ to $P'_{93}$ of the first pulse width T, second pulse components $P'_{94}$ and $P'_{95}$ of the second pulse width $t$, and third pulse components $P'_{96}$ and $P'_{99}$ of the third pulse width $t'$. The third pulse component $P'_{96}$ is in synchronism with the third pulse component $P_{96}$ of the digit drive signal D and has a voltage potential V different from that of the third pulse component $P_{96}$ of the digit drive signal D. Likewise, the third pulse component $P'_{97}$ is in synchronism with the third pulse component $P_{97}$ of the digit drive signal D and has a voltage potential different from that of the third pulse component $P_{97}$. The second pulse component $P'_{94}$ is in synchronism with the second pulse component $P_{94}$ of the digit drive signal D and has the same voltage potential as that of the second pulse component $P_{94}$. It will thus be seen that the potential difference across the electrodes will become zero in synchronism with the second pulse components of the digit and segment drive signals and have an intermediate level between those of adjacent pulse components in synchronism with the third pulse components of the digit and segment drive signals. In this manner, an optimum contrast ratio is obtained and the power consumption is remarkably reduced for a reason as previously discussed above. It is to be noted that, while the pulse width $t'$ of the third pulse component has been shown as being equal to the pulse width $t$ in FIG. 42, the pulse width $t'$ may have a value different from the pulse width $t$.

While the driver circuit of the present invention has been shown and described as applied to a normal liquid crystal display matrix of the twisted nematic type, it should be noted that the present invention may be applied to a color display liquid crystal to control the color variation. There are two types of color display liquid crystals, driven in an electrically controlled birefringence effect (ECB effect) and a guest-host effect. In a liquid crystal of the guest-host effect type, "guest" pleochronic dyes are incorporated within nematic "host" materials. The dyes have different absorption coefficients parallel and perpendicular to their optical axis. The dye molecules can be oriented by the electric field. With zero field, the liquid crystal is in the uniform parallel orientation and the dye molecules are aligned with long axis parallel to the optical vector of the linearly polarized light. In this configuration, the dye molecules have absorption bands in the visible. Above the threshold voltage, the nematic fluid of positive dielectric anisotropy tends to align parallel to the field. This is the condition for low dye absorption. Consequently, a color variation can be observed between the two states. In a liquid crystal of the ECB effect type, with no applied voltage, the nematic crystal liquid is in the perpendicular state. The surface orientation of the molecules remains constant even when the field is applied, while the voltage-induced deformation increases toward the center of the cell. When the applied voltage exceeds the threshold voltage, the liquid crystal distorts if it has negative dielectric anisotropy. The perpendicular texture is optically isotropic to light propagating perpendicular to the cell walls. Consequently, with crossed polarizer and analyzer, no light is transmitted through the analyzer. During fluid deformation, the liquid crystal becomes birefringence to the transmitted light, and part of the light passes through the analyzer. In this manner, a color variation can be observed among various states.

As described above, since the color variation can be obtained by controlling an applied voltage, a driving technique disclosed by the present invention can be applied to the color display liquid crystal and it is possible to change the color of the liquid crystal by varying duty of drive signals in a manner as already discussed above with reference to several embodiments.

The driving technique disclosed by the present invention can also be applied to the guest-host method so as to adjust the contrast ratio between different colors. In this case, the root means square voltage applied for the nonselected display element is reduced by changing the duty of the drive signals. As previously noted, the temperature variation can be compensated by making it possible to change the duty of the drive signal with the use of the ring counter.

It should be noted that a multi-color display of the liquid crystal may be applied to display various data with different colors in an electronic timepiece in dependence on time information or internal mode or state of the timepiece. For example, different colors may be used for indicating AM/PM marking, differentiating the display of hours and minutes from the display of months and dates, and indicating the digit to be corrected. In addition, in a case in which the duty of the drive signal is changed in dependence on the ambient temperature, it is possible to display temperature information together with time information. In an application of the color display to calculators, different colors may be used for indicating that a memory key is pushed on and the stored data are displayed.

It will thus be understood from the foregoing description that a driver circuit proposed by the present invention has various advantages and has many applications.

While the present invention has been shown and described with reference to particular embodiments, it should be noted that various other changes or modifications can be made without departing from the scope of the present invention.

What is claimed is:

1. In a method of driving a display device comprising a matrix of display elements in an array including a plurality of digit electrodes and a plurality of segment electrodes, in which the display device comprises a liquid crystal having an intrinsic threshold voltage and an intrinsic saturation voltage and is operative at a predetermined operating margin, and in which digit drive signals are applied to said digit electrodes and segment drive signals are applied to said segment electrodes in timed relationship to said application of said digit drive signals, the improvement characterized in that each of the digit drive signals comprises a plurality of first pulse components of a first pulse width and varying at a plurality of voltage potentials during each one cycle period and a plurality of second pulse components of a second pulse width, each of said second pulse components appearing between adjacent ones of said first pulse components during each half cycle period, and each of said segment drive signals comprises a plurality of first pulse components of a pulse width equal to said first pulse width and varying at least two of said plurality of voltage potentials to be effective for providing a potential difference across said digit and segment electrodes to select a light transparent or a light scattering state of said and a plurality of second pulse components of a pulse width equal to said second pulse width and each appearing between adjacent ones of the first pulse components of each of said segment drive signals during said each half cycle period, wherein the second pulse components of said digit drive signals and said segment drive signals are in phase with each other and have the same voltage potential as that corresponding to one of said plurality of voltage potentials during said each half cycle period so that all of said digit electrodes and said segment electrodes are concurrently applied with the same voltage to zero the potential difference across said digit and segment electrodes during said each half cycle period for a predetermined time interval defined by said second pulse width whereby the root-mean-square values of voltages across said digit electrodes and said segment electrodes for the light transparent and light scattering states are close to said intrinsic threshold voltage and said intrinsic saturation voltage of said liquid crystal without changing said operating margin.

2. The method according to claim 1, in which the ratio of said second pulse width to said first pulse width is selected to a prescribed value in dependence on said intrinsic threshold voltage.

3. The method according to claim 1, in which the ratio of said second pulse width to said first pulse width is varied in dependence on an ambient temperature whereby a duty cycle of said digit and segment drive signals depend on said ambient temperature.

4. In a method of driving a display device comprising a matrix of display elements in an array including a plurality of digit electrodes and a plurality of segment electrodes, in which the display device comprises an intrinsic threshold voltage and an intrinsic saturation voltage, the improvement comprising the steps of:

applying first digit drive signals to said plurality of digit electrodes when an ambient temperature is below a predetermined value, said first digit drive signals being identical in waveform but different in phase from one another and each including first pulse components of a first pulse width, said first pulse components varying at a plurality of voltage potentials in a first predetermined sequence during each one cycle period;

applying first segment drive signals to said plurality of segment electrodes when said ambient temperature is below said predetermined value, each of said first segment drive signals including first pulse components varying at two levels of said plurality of voltage potentials;

applying second digit drive signals to said plurality of digit electrodes when said embient temperature exceeds said predetermined value, said second digit drive signals being identical in waveform but different in phase from one another and each including second pulse components of a pulse width equal to said first pulse width and varying at said plurality of voltage potentials in said first predetermined sequence during said each one cycle period and third pulse components of a second pulse width, each of said third pulse components appearing between adjacent ones of said second pulse components during each half cycle period; and applying second segment drive signals to said plurality of segment electrodes when said ambient temperature exceeds said predetermined value, each of said second segment drive signals including second pulse components of a pulse width and varying at two levels of said plurality of voltage potentials and third pulse components of a pulse width equal to said second pulse width, each of said third pulse components of said second segment drive signals appearing between adjacent ones of said second pulse components of said second segment drive signals during said each half cycle period;

wherein the third pulse components of said second digit drive signals and said second segment drive signals are in phase with each other and have the same voltage potential as that corresponding to one of said plurality of voltage potentials during said each half cycle period so that said second digit drive signals and said second segment drive signals have duty cycles different from those of said first digit drive signals and said first segment drive signals.

5. In a method of driving a display device comprising a matrix of display elements in an array including a plurality of digit electrodes and a plurality of segment electrodes, in which said display device comprises a liquid crystal having an intrinsic threshold voltage and an intrinsic saturation voltage, and in which digit drive signals are applied to said digit electrodes and first, second, third and fourth segment drive signals are selectively applied to said segment electrodes in timed relationship to said application of said digit drive signals, the improvement characterized in that:

each of said digit drive signals comprises a plurality of first pulse components of a first pulse width and varying at a plurality of voltage potentials during each one cycle period and a plurality of second pulse components of a second pulse width, each of said second pulse components appearing between adjacent ones of said first pulse components during said each one cycle period and having the same voltage potential as that corresponding to one of said plurality of voltage potentials; and each of said first, second, third and fourth segment drive signals comprises a plurality of third pulse components of a third pulse width and varying at two levels of said plurality of said voltage potentials and a plurality of fourth pulse components of a fourth pulse width equal to said second pulse width and having a voltage potential equal to said fixed voltage potential, each of said fourth pulse components appearing between said third pulse components during said each one cycle period;

wherein the fourth pulse components of said first and second segment drive signals are in phase with one of said second pulse components of said digit drive signals and the fourth pulse components of said third and fourth segment drive signals are in phase with another one of said second pulse components of said digit drive signals.

* * * * *